(12) United States Patent
Shimazu et al.

(10) Patent No.: US 7,838,460 B2
(45) Date of Patent: *Nov. 23, 2010

(54) NANOPOROUS METAL OXIDE MATERIAL, CATALYST SUPPORT, AND CATALYST FOR HYDROGEN PRODUCTION REACTION USING THE SAME

(75) Inventors: Takashi Shimazu, Nagoya (JP); Ryusuke Tsuji, Niwa-gun (JP); Hideo Sobukawa, Nisshin (JP); Yoshiki Seno, Toyota (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 835 days.

This patent is subject to a terminal disclaimer.

(21) Appl. No.: 11/341,533

(22) Filed: Jan. 30, 2006

(65) Prior Publication Data

US 2006/0172885 A1  Aug. 3, 2006

(30) Foreign Application Priority Data

Jan. 28, 2005   (JP)   ............... 2005-022155

(51) Int. Cl.
*B01J 23/10*   (2006.01)
(52) U.S. Cl. ............ 502/304; 502/300; 502/303; 502/311; 502/251; 502/242; 423/263; 423/326; 423/327.1; 423/331; 423/593.1; 106/600; 106/286.4; 106/286.5; 106/286.6

(58) Field of Classification Search ............... None
See application file for complete search history.

(56) References Cited

U.S. PATENT DOCUMENTS

| 6,171,572 B1 * | 1/2001 | Aozasa | ............. 423/594.12 |
| 6,391,276 B1 * | 5/2002 | Suda et al. | ............. 423/598 |
| 2002/0049137 A1 * | 4/2002 | Morikawa et al. | ............. 502/351 |
| 2006/0172886 A1 * | 8/2006 | Shimazu et al. | ............. 502/325 |
| 2007/0215009 A1 * | 9/2007 | Shimazu et al. | ............. 106/600 |

FOREIGN PATENT DOCUMENTS

| EP | 1172139 | * | 7/2000 |
| EP | 1172139 A1 | * | 7/2000 |
| JP | 10-182155 | | 7/1998 |
| JP | 07-300315 | | 11/1998 |
| JP | 2002-079097 | | 3/2002 |
| JP | 2002-282689 | * | 10/2002 |
| WO | WO 2005/121025 A1 | | 12/2005 |

* cited by examiner

*Primary Examiner*—Melvin C Mayes
*Assistant Examiner*—Smita Patel
(74) *Attorney, Agent, or Firm*—Oblon, Spivak, McClelland, Maier & Neustadt, L.L.P.

(57) ABSTRACT

A nanoporous metal oxide material comprising two or more metal oxides, wherein the nanoporous metal oxide material has ceria content of 10 to 60 weight %, zirconia content of 20 to 90 weight %, and alumina content of 70 weight % or less, and has nanopores whose diameters are 10 nm or less, and the metal oxides are homogeneously dispersed in a wall constituting the nanopores.

18 Claims, 8 Drawing Sheets

NANOPOROUS METAL OXIDE MATERIAL, CATALYST SUPPORT, AND CATALYST FOR HYDROGEN PRODUCTION REACTION USING THE SAME

BACKGROUND OF THE INVENTION

1. Field of the Invention

The present invention relates to nanoporous metal oxide materials effective as catalyst supports for hydrogen production reaction and so on, catalyst supports, and catalysts for hydrogen production reaction using such catalyst supports.

2. Related Background Art

Various catalysts have been developed so far for hydrogen production reaction to generate hydrogen as a fuel in fuel reforming systems such as fuel cells. Various kinds of substrates including honeycomb filters on which a metal oxide such as alumina, and a noble metal such as platinum, rhodium and palladium are supported, have been generally used as such catalysts.

In general, powder obtained by wet grinding method has been heretofore used as such metal oxides. For example, Japanese Patent Application Laid-Open Gazettes No. Hei. 10-182155 (Document 1) and No. 2002-79097 (Document 2) disclose methods to obtain compound metal oxide powder by preparing oxide precursors from salt solutions of aluminum, cerium and zirconium by coprecipitation method and then calcining the yielded oxide precursors in the air. In addition, in Japanese Patent Application Laid-Open Gazette No. Hei. 7-300315 (Document 3), a method is disclosed to obtain compound metal oxide powder by first adding boehmite alumina powder to a mixed solution of salt solutions of cerium and zirconium, and the mixture was then stirred followed by the drying and calcination of the resultant.

However, when conventional metal oxide powder like that described in Documents 1 to 3 is used, adhesion to substrates (especially to metal substrates) is not always sufficient and there is also a limitation for formation of thin film coating formed on the substrate. Therefore, it has been a problem because of difficulties in supporting such conventional metal oxide powder when using substrates such as metallic honeycomb filters and high density (high integration) honeycombs (e.g. microchannels equal to or greater than 1200 cell/inch$^2$) with narrower tubular passages than those of common honeycomb filters, as well as limitation in the improvements of reforming performances.

SUMMARY OF THE INVENTION

The present invention was made in the light of problems associated with the above described conventional technologies. The object of the present invention is to provide nanoporous metal oxide materials with high adhesion to various substrates like honeycomb filters and heat tolerance (heat resistance), and further capable of forming thin film coating formed on substrate, and also capable of forming coating with high level of adhesion to various substrates such as metallic honeycomb filters and high density honeycombs as well as excellent heat tolerance. The object of the present invention is also to provide catalyst supports capable of sufficiently improving reforming performances in hydrogen production reaction and catalysts for hydrogen production reaction using the nanoporous metal oxide materials.

In order to accomplish the above-described objects, the present inventors have made the following discoveries as a result of eager studies leading to the completion of the present invention. Metal oxide coating obtained by using colloidal solutions of metal oxides or metal salt solutions as they are is non-uniform with insufficient adhesion and heat tolerance property. However, when colloidal solutions of metal oxides or metal salt solutions are mixed at a high shear rate and heat treated without practical coprecipitation, obtained metal oxide coating is surprisingly novel having nanopores with diameters of 10 nm or less and having its metal oxides dispersed homogenously in the wall constituting the nanopores. Adhesion to various substrates and heat tolerance are also improved in the obtained metal oxide coating, and it is possible to form thin film coating by using the obtained metal oxide coating. By making such metal oxide coating as zirconia/ceria binary-component coating containing specified amounts of zirconia and ceria, or as zirconia/ceria/alumina triple-component coating containing specified amounts of zirconia, ceria, and alumina, catalysts for hydrogen production reaction with highly excellent reforming performances in hydrogen production reaction can be obtained.

A nanoporous metal oxide material of the present invention comprises two or more metal oxides, wherein the nanoporous metal oxide material has ceria content of 10 to 60 weight %, zirconia content of 20 to 90 weight %, and alumina content of 70 weight % or less, and has nanopores whose diameters are 10 nm or less, and the metal oxides are homogeneously (uniformly) dispersed in a wall constituting the nanopores.

Moreover, a catalyst support of the present invention comprises a substrate, and coating made of nanoporous metal oxide material formed from two or more metal oxides formed on the surface of the substrate, wherein the nanoporous metal oxide material has ceria content of 10 to 60 weight %, zirconia content of 20 to 90 weight %, and alumina content of 70 weight % or less, and has nanopores whose diameters are 10 nm or less, and the metal oxides are homogeneously (uniformly) dispersed in a wall constituting the nanopores.

The nanoporous metal oxide materials are preferably obtained by heat treating a fluid raw material composition containing zirconia colloidal particles and/or a zirconium salt solution and ceria colloidal particles and/or a cerium salt solution without practical coprecipitation after mixing the composition at a shear rate of 1000 sec$^{-1}$ or higher. Alumina colloidal particles and/or an aluminum salt solution can be further contained in the fluid raw material composition.

Moreover, at least one powder selected from the group consisting of zirconia powder, ceria powder and alumina powder which have average particle size of 0.01 to 50 μm can be further contained in the nanoporous metal oxide materials.

In addition, the nanoporous metal oxide materials preferably satisfy the following condition (I).

(I) When spectra for all the metal elements of metal oxides whose content in the nanoporous metal oxide material is 10 at % or more are measured by energy dispersive X-ray spectroscopy at measuring points in a region where a sample thickness can be regarded as almost constant using transmission electron microscope with electron beam diameter of 1.0 nm and an accelerating voltage of 200 kV, a mean $X_m$ of relative intensity ratio X derived by converting integrated intensity of fluorescent X-ray peak of each metal element in obtained spectra to relative ratio, and the second moment $v_2$ around the mean $X_m$ satisfy a condition expressed by the formula (1) described below for all the metal elements.

$$v_2/X_m^2 \leq 0.02 \tag{1}$$

[$X_m$ is the mean of relative intensity ratio X and is described by the equation $X_m=(\Sigma X)/N$(N being the number of measuring points), $v_2$ is the second moment around the mean $X_m$ and is described by the equation $v_2=\{\Sigma(X-X_m)^2\}/N$, and $v_2/X_m^2$ is the second moment normalized to the square of the mean $X_m$, in the formula (1).]

Furthermore, the nanoporous metal oxide materials more preferably satisfy at least one of the following conditions (II) to (V).

(II) When an equation (2) described below is obtained by an arbitrary line analysis of a range of 0.5 mm or more for all metal elements of metal oxides whose content is 10 at % or more in the nanoporous metal oxide material using X-ray microanalyzer with an electron beam diameter of 1.0 μm and an accelerating voltage of 15 kV, a K value expressed by the equation (2) satisfies a condition expressed by a formula (3) described below for all the metal elements in 65% or more of measuring points out of total measuring points.

$$K \text{ value (\%)} = (X\text{-ray intensity detected from nanoporous metal oxide material})/(X\text{-ray intensity obtained from pure substance}) \tag{2}$$

$$\frac{|K-Km|}{Km} \leq 0.02 \tag{3}$$

[K is the K value (%) at each measuring point and $K_m$ is a mean of K values of all the measuring points, in the formula (3). Note here that a part corresponding to cracks formed in the nanoporous metal oxide material is excluded from the measuring points.]

(III) When a surface height image of the nanoporous metal oxide material is measured arbitrarily with a tapping mode by a scanning probe microscope using a tip with a curvature radius of 5 nm with an interval of 3 nm or more and less than 4 nm, a height image H(L) derived as a function of a scan length L total of 2 μm or more satisfies a condition expressed by a formula (4) described below in 80% or more of measuring points out of total measuring points and also a second derivative H"(L) derived from formulae (5) and (6) described below satisfies a condition expressed by a formula (7) described below in 60% or less of measuring points out of total measuring points.

$$H(L) \leq 20 \text{ nm} \tag{4}$$

[H(L) is a height image (nm) at each measuring point (scan length=L) in the formula (4). Note here that a mean of height images H of all the measuring points is set to zero.]

$$H'(L) = \frac{dH}{dL} = \frac{H(L+\Delta L)-H(L)}{\Delta L} \tag{5}$$

$$H''(L) = \frac{d^2H}{dL^2} = \frac{H'(L+\Delta L)-H'(L)}{\Delta L} \tag{6}$$

[H(L) is a height image (nm) at a measuring point where a scan length=L, H(L+ΔL) is a height image (nm) at a measuring point where a scan length=L+ΔL, ΔL is an interval (nm) among measuring points, H'(L) is a first derivative of a height image H(L), H'(L+ΔL) is a first derivative of a height image H(L+ΔL), and H"(L) is a second derivative of a height image H(L), in the formulae (5) and (6). Note here that ΔL is set to 4 nm by linear interpolation among measuring points.]

$$-0.05 \text{ nm}^{-1} \leq H''(L) \leq 0.05 \text{ nm}^{-1} \tag{7}$$

(IV) When a measuring line is drawn arbitrarily for total of 400 μm or more on the nanoporous metal oxide material in an electron micrograph of a section of the nanoporous metal oxide material, length ratio of a part where the measuring line intersects with a void portion formed in the nanoporous metal oxide material satisfies a condition that it is 10% or less of total length of the measuring line.

(V) When spectra for all metal elements of metal oxides whose content in the nanoporous metal oxide material is 10 at % or more are measured by energy dispersive X-ray spectroscopy at 10 or more arbitral measuring points using transmission electron microscope with an electron beam diameter of 1.0 nm and an accelerating voltage of 200 kV, a mean $X_m$ of relative intensity ratio X derived by converting integrated intensity of fluorescent X-ray peak of each metal element in obtained spectra to relative ratio and a second moment $v_2$ around the mean $X_m$ satisfy a condition expressed by a formula (8) described below for all the metal elements.

$$v_2/X_m^2 \leq 0.1 \tag{8}$$

[$X_m$ is the mean of relative intensity ratio X and is described by the equation $X_m=(\Sigma X)/N$(N being the number of measuring points), $v_2$ is the second moment around the mean $X_m$ and is described by the equation $v_2=\{\Sigma(X-X_m)^2\}/N$, and $v_2/X_m^2$ is the second moment normalized to the square of the mean $X_m$, in the formula (8).]

The nanoporous metal oxide material of the present invention preferably further supports a noble metal on its surface.

Moreover, the catalyst for hydrogen production reaction of the present invention has the catalyst support of the present invention and a noble metal supported on the surface of the catalyst support.

According to the present invention, it is possible to provide nanoporous metal oxide materials with high adhesion to various substrates like honeycomb filters and excellent heat tolerance, and further capable of forming thin film coating formed on the substrate, and also capable of forming coating with high level of adhesion to various substrates such as metallic honeycomb filters and high density honeycombs as well as excellent heat tolerance. According to the present invention, it is also possible to provide catalyst supports capable of sufficiently improving reforming performances in hydrogen production reaction and catalysts for hydrogen production reaction using the nanoporous metal oxide materials.

DETAILED DESCRIPTION OF THE PREFERRED EMBODIMENTS

Figure 1:
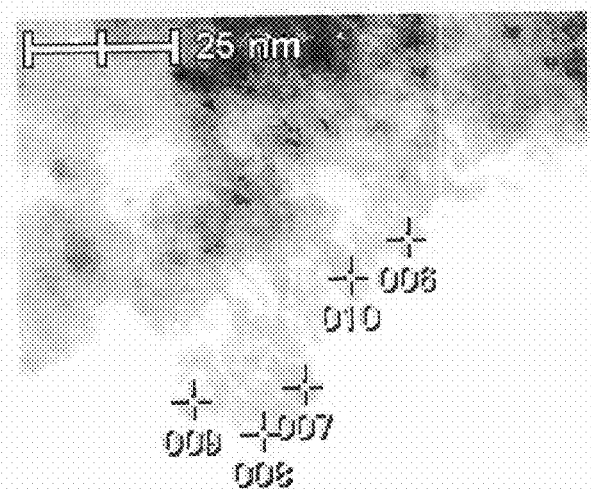
FIG. 1 is a transmission electron micrograph showing a part where satisfactory element analysis is impossible to perform.

Present invention will be described below in detail according to the preferred embodiments. Firstly, nanoporous metal oxide materials of the present invention and catalyst supports using the materials of the present invention will be described.

The nanoporous metal oxide materials of the present invention are nanoporous metal oxide materials comprising two or more metal oxides and characterized by the following features. The nanoporous metal oxide materials contain ceria (10 to 60 weight %), zirconia (20 to 90 weight %) and alumina (70 weight % or less), and also have nanopores whose diameters are 10 nm or less. Moreover, the metal oxides are dispersed homogenously in the wall constituting the nanopores.

Moreover, the catalyst support of the present invention is characterized by the provision of a substrate, and coating made of the nanoporous metal oxide material of the present invention and formed on the surface of the substrate.

When the nanoporous metal oxide material according to the present invention is consisted of two components; i.e. zirconia and ceria, ceria content of 10 to 60 weight % and zirconia content of 40 to 90 weight % are more preferable. When the content of ceria is lower than the lower limit, conversion rate is low especially in low temperature and achieved hydrogen concentration does not sufficiently improve either. On the other hand, when the content of ceria exceeds the upper limit, adhesion to various substrates deteriorates.

Additionally, when the nanoporous metal oxide material according to the present invention is consisted of three components; i.e. zirconia, ceria and alumina, when the content of ceria is lower than the lower limit, conversion rate is low especially in low temperature and achieved hydrogen concentration does not sufficiently improve either. On the other hand, when the content of ceria exceeds the upper limit, adhesion to various substrates deteriorates. Moreover, when the content of alumina exceeds the upper limit, conversion rate is low especially in low temperature and achieved hydrogen concentration does not sufficiently improve either. Alumina content of 50 weight % or less is preferable since conversion rate in low temperature as well as hydrogen concentration achieved tends to improve further.

Nanoporous metal oxide materials of the present invention are porous materials made of the aforementioned metal oxides, having nanopores with diameters of 10 nm or less, and having the metal oxides dispersed homogenously in the wall constituting the nanopores.

The nanoporous metal oxide materials of the present invention have microscopic pores with diameters of 10 nm or less, preferably 5 nm or less, and more preferably 2 nm or less. For this reason, in the nanoporous metal oxide materials of the present invention, improvements in adhesion to various substrates and heat tolerance (heat resistance) are possible compared to porous metal oxide materials without such microscopic pores. Furthermore, improvements in performance as catalyst supports and so on are achieved due to increase in specific surface area and improvements in stability in supporting noble metals and so on in the nanoporous metal oxide materials of the present invention.

Moreover, in nanoporous metal oxide materials of the present invention, the metal oxides are homogeneously (uniformly) dispersed in the wall constituting nanopores. In other words, in nanoporous metal oxide materials of the present invention, it can be assumed that two or more metal oxides constituting nanoporous metal oxide materials are practically dispersed (high dispersion) homogeneously at an atomic level. This is clearly different from a state where primary particles of approximately 100 nm consisted of each metal oxides are mixed or a state where one metal oxide is coating the surface of primary particles of the other metal oxide seen with the conventional porous metal oxide materials obtained by coprecipitation method and so on. Such extremely high level of component homogeneousness (uniformity) can never be attained with the metal oxides obtained by using colloidal solutions of metal oxides or metal salt solutions as they are. This has only become achievable for the first time by mixing a colloidal solution containing two or more metal oxides or a solution containing two or more metal salts at a high shear rate and heat treating the resultant without practical coprecipitation by the producing method described later. In addition, in nanoporous metal oxide material of the present invention with such extremely high level of component homogeneousness, surprisingly, adhesion to various substrates and heat tolerance are dramatically improved compared to those of conventional porous metal oxide materials obtained by coprecipitation method and so on.

Forms of nanoporous metal oxide materials of the present invention are not particularly limited and can be thin film forms, powdered forms, or compacts obtained by forming from those forms into predetermined forms. When nanoporous metal oxide materials of the present invention are in thin film forms, the thickness of the films is not particularly limited and are adjusted according to their usage and so on where appropriate. Moreover, the thickness of aforementioned coating formed on the surface of the substrate in the catalyst supports of the present invention is not particularly limited and is adjusted according to substrates used, usage of obtained catalysts and so on where appropriate. However, the coating thickness is preferably approximately 1 to 300 μm and more preferably approximately 1 to 50 μm, since it is possible to form homogeneous (uniform) coating with excellent adhesion to various substrates like metallic honeycomb filters even when nanoporous metal oxide materials of the present invention are thin. Furthermore, it is possible to form coating with reduced film thickness on the surface of the substrate according to the present invention. Therefore, it is possible to form coating with high level of adhesion and excellent heat tolerance even to high density (high integration) honeycombs on which forming sufficient coating has been conventionally difficult. Accordingly, coating thickness of approximately 1 to 30 μm is especially preferable from such a point of view.

Moreover, when nanoporous metal oxide materials of the present invention are in powder forms, the average particle size of them is not particularly limited and is adjusted according to their usage and so on where appropriate. However, the size of approximately 0.01 to 50 μm is preferable in general. When such powdered material with its average particle size smaller than 0.01 μm is difficult to produce by grinding of metal oxides. On the other hand, when the average particle size of powdered material exceeds 50 μm, coating thickness becomes highly thick and adhesion tends to deteriorate.

Such nanoporous metal oxide materials of the present invention are those obtained by mixing either (i) a fluid raw material composition containing zirconia colloidal particles and/or a zirconium salt solution and ceria colloidal particles and/or a cerium salt solution, or (ii) a fluid raw material composition containing zirconia colloidal particles and/or a zirconium salt solution, ceria colloidal particles and/or a cerium salt solution, and alumina colloidal particles and/or an aluminum salt solution, at a shear rate of 1000 $sec^{-1}$ or higher and heat treating the resultant without practical coprecipitation.

Moreover, when nanoporous metal oxide materials in thin film forms in the catalyst supports of the present invention are obtained, a method of heat treating substrates applied with the fluid raw material composition mixed at the high shear rate without practical coprecipitation is preferably adopted.

Colloidal particles of zirconia, ceria or alumina used in the present invention are colloidal particles with average particle size of 5 to 200 nm, preferably 5 to 100 nm. As for the colloidal particles with average particle size smaller than 5 nm, preparation of stabilized particles is difficult. On the other hand, various problems such as reductions in mixing/dispersibility, adhesion, and reactivity will arise when the particle size exceeds 200 nm. Shapes of such colloidal particles are not particularly limited here and examples include acicular particles, rod particles, feathery particles, spherical particles, and particles of indeterminate forms.

Moreover, salts of zirconium, cerium or aluminum can be used together with, or instead of, colloidal particles of zirconia, ceria or alumina in the present invention. Water-soluble salts such as nitrates, acetates, chlorides, sulfates, sulfites, and inorganic complex salts are preferably used as such metal salts and examples include aluminum nitrate, zirconium oxynitrate, cerium nitrate, zirconium acetate, and zirconium oxysulfate.

Furthermore, a solvent for preparing the fluid raw material composition according to the present invention is not particularly limited and various solvents such as water and alcohol (e.g. solvents consisted of methanol, ethanol, and ethylene glycol singly and/or combination of them) are used. Mixed solvents of water and alcohol are preferable and those containing alcohol of 40 to 100% by weight are more preferable, and those containing alcohol of 55 to 80% by weight are especially preferable from the viewpoint of improvements in adhesion to metal substrates. Moreover, although pH of the metal salt solution according to the present invention is not particularly limited, metal salt solutions with pH of 3.0 to 6.0 are preferable from the viewpoint that metal ions exist more stably in the solution.

Additionally, powder of zirconia, ceria or alumina with average particle size of 0.01 to 50 μm (preferably 0.01 to 10 μm) can be further contained in the fluid raw material composition in the present invention. Such powder with average particle size smaller than 0.01 μm is difficult to produce by grinding of metal oxides. On the other hand, when the average particle size of powder exceeds 50 μm, coating thickness becomes highly thick and adhesion tends to deteriorate. Note that a material obtained by drying the solution containing a metal salt followed by the grinding of the resultant, is preferably used as such metal oxide powder. Moreover, its average particle size is desirably equal to or less than the thickness of coating to be obtained.

Furthermore, when such metal oxide powder is used, it is also possible to support a noble metal on the surface thereof in advance. Platinum, rhodium, palladium, osmium, iridium, gold, and so on can be used as such a noble metal and platinum, rhodium and palladium are preferable among them. The amount of such a noble metal to be supported is not particularly limited and is adjusted depend on the usage of obtained catalysts and so on where appropriate. However, the amount of approximately 0.1 to 10 weight parts relative to 100 weight parts of metal oxides constituting the coating to be obtained is generally adopted. Moreover, specific method to support such a noble metal is not particularly limited. For example, a method firstly immersing the powder in a solution obtained by dissolving a noble metal salt (e.g. nitrate, chloride, acetate) or a noble metal complex in a solvent such as water and alcohol, and then calcinating and grinding the resultant after the removal of solvent, is preferably adopted. Note here that drying conditions of 30 to 150° C. for approximately 10 minutes or less and calcination conditions of 250 to 300° C. for approximately 30 to 60 minutes in an oxidizing atmosphere (e.g. air) are preferable when removing solvent in the step to support the noble metal. In addition, it is possible to repeat the noble metal supporting step until the desirable amount is supported.

In the present invention, a coating composition is obtained by mixing the fluid raw material composition at a shear rate of 1000 $sec^{-1}$ or higher, more preferably 10000 $sec^{-1}$ or higher, and especially preferably 20000 $sec^{-1}$ or higher. When such shear rates are lower than 1000 $sec^{-1}$, obtained nanoporous metal oxide materials will not satisfy the component homogeneousness described later with insufficient improvements in adhesion to substrates and heat tolerance. Note that such shear rates are preferably 200000 $sec^{-1}$ or less although the upper limit for such shear rates is not particularly limited.

Although equipments used here are not particularly limited as long as they are usable for mixing at such high shear rates, homogenizers are suitably used. Moreover, mixing time at such high shear rates is not particularly limited either, although approximately 1 to 20 minutes (preferably 1 to 5 minutes) of mixing time is common.

Concentrations (solid concentration) of the fluid raw material composition mixed at such high shear rates, are adjusted depend on the forms of the intended nanoporous metal oxide materials to be obtained (e.g thickness and particle size) and viscosity suited for the application and powdering methods and so on where appropriate. Generally, solid concentration is approximately 5 to 50% by weight and preferably is approximately 10 to 15% by weight.

Additionally, further degassing treatment can be carried out in the present invention by gently stirring (e.g. 20 to 100 rpm) the mixed fluid raw material composition for about 1 to 2 minutes in order to remove air bubbles in the obtained fluid raw material composition.

In the fluid raw material composition according to the present invention described above, various components of the colloidal particles and/or the metal salts are dispersed extremely homogeneously (uniformly). By heat treating such fluid raw material composition practically without coprecipitation, the aforementioned nanoporous metal oxide materials of the present invention is obtained. Accordingly, it becomes possible to form the metal oxide coating with high adhesion to various substrates like honeycomb filters and excellent heat tolerance and furthermore, it becomes possible to form thin film coating formed on the substrate. Therefore, according to the present invention, it becomes possible to form the coating of the nanoporous metal oxide materials in thin film forms uniformly having high level of adhesion to substrates such as metallic honeycomb filters and high density (high integration) honeycombs and excellent heat tolerance.

As described above, it is necessary to heat-treat the fluid raw material composition without practical coprecipitation. The phrase "without practical coprecipitation" describes the state where metal elements in the fluid raw material composition solidify due to the heat treatment and become metal oxides practically without going through the state of metal hydroxides. More specifically, the phrase describes the case where ratio of metal hydroxides in metal components in the fluid raw material composition before such heat treatment is 50 at % or less (more desirably 30 at % or less).

Intended nanoporous metal oxide materials are obtained by mixing the fluid raw material composition at the aforementioned high shear rates and heat treating the resultant without practical coprecipitation. Moreover, when metal salt solutions are used as the fluid raw material composition, nanoporous metal oxide materials of the present invention described above can be obtained by oxidizing metal components in the fluid raw material composition to metal oxides with such heat treatment.

In the present invention, the fluid raw material composition is preferably heated treated rapidly after the mixing. Specific method for such heat treatment is not particularly limited. However, a method of rapidly drying the fluid raw material composition after its mixing described above and further calcinating the resultant where necessary, is preferably adopted.

In the present invention, time spent between the mixing of the fluid raw material composition at high shear rates and the heat treatment of the fluid raw material composition is desirably as short as possible, preferably within about 60 minutes and more preferably within about 30 minutes. When the time exceeds the upper limit, metal oxides aggregate before and during the heat treatment step due to the reduction in the effect of stirring at high shear rates. Accordingly, it becomes difficult to obtain nanoporous metal oxide materials with sufficiently improved adhesion and heat tolerance.

Moreover, it is desirable to dry the fluid raw material composition rapidly before calcination by removing solvents although the calcination process described later may include a drying process. A drying condition of temperature of 60 to 180° C. within 10 minutes is more preferable in that case and a drying condition of temperature of 100 to 150° C. within 5 minutes is especially preferable. When the drying temperature is lower than the lower limit, rapid drying is unlikely to be achieved sufficiently. On the other hand, when the drying temperature exceeds the upper limit, drying rate becomes too fast and evaporation rate of water far exceeds the film formation rate causing cracks and fractures, and resulting in the considerable reduction in adhesion. Moreover, when the drying time exceeds the upper limit, metal oxides aggregate during drying process due to the reduction in effect of stirring at high shear rates, and it becomes unlikely to obtain nanoporous metal oxide materials with sufficiently improved adhesion and heat tolerance. Note that fluid raw material composition should preferably be dried until the proportion of water content becomes 200 weight % or less (especially preferably 100 weight % or less) in such rapid drying process.

Furthermore, calcinating in oxidizing atmosphere (for example, air) for 20 to 70 minutes (especially preferably 30 to 60 minutes) at the temperature of 250 to 600° C. (especially preferably temperature of 350 to 500° C.) is more preferable as the calcination conditions. When the calcinating temperature is lower than the lower limit, sufficient calcination is not achieved and the nanoporous metal oxide materials with sufficiently improved adhesion and heat tolerance is unlikely to be obtained. On the other hand, when the calcinating temperature exceeds the upper limit, reduction in sintering performance and so on tends to occur due to the high temperature oxidizing atmosphere. Moreover, when the calcinating time is shorter than the lower limit, sufficient calcination is not achieved and nanoporous metal oxide materials with sufficiently improved adhesion and heat tolerance is unlikely to be obtained. On the other hand, when the calcinating time exceeds the upper limit, metal oxides aggregate during the calcinating process due to the reduction in effect of stirring at high shear rates, and it becomes unlikely to obtain nanoporous metal oxide materials with sufficiently improved adhesion and heat tolerance.

It should be noted that materials in forms of thin film, powder, and so on can be obtained preferably as the nanoporous metal oxide materials of the present invention in the above described producing method of the present invention.

A method of heat treating the substrates applied with the fluid raw material composition after mixing at the high shear rate without practical coprecipitation is preferably adopted when obtaining thin film-formed nanoporous metal oxide materials in the catalyst supports of the present invention.

Substrates used in the present invention are not particularly limited. Monolith support substrates (e.g. honeycomb filters, high density honeycombs), foam filter substrates, pellet substrates, plate substrates and so on are suitably adopted. Moreover, properties of materials used for such substrates are not particularly limited either. Substrates made of ceramics such as cordierite, silicon carbide, mullite, and so on as well as substrates made of metals like stainless steel containing chromium and aluminum, and so on are suitably adopted. It should be noted that when metal substrates are used, the application of heat treatment at 300 to 1000° C. for approximately 1 to 10 hours to form oxide film on the surface thereof in advance is preferable since adhesion tends to further improve. The amount of fluid raw material composition applied onto substrates in the present invention is not particularly limited, and is adjusted depend on the type of substrates used and usage of obtained catalysts and so on where appropriate. The preferable amount of metal oxides constituting the coating is approximately 10 to 300 g relative to 1 liter of substrate volume.

Moreover, specific method to apply the fluid raw material composition onto substrates is not particularly limited in the present invention. For example, a method of immersing substrates in the fluid raw material composition, and a method of applying the fluid raw material composition onto substrate surface by sprays and so on are preferably adopted.

In addition, it is possible to repeat the step of applying the fluid raw material composition onto substrates until the desirable amount is supported. In this case, substrates are preferably precalcinated after the application and drying of the fluid raw material composition. Precalcinating at the temperature of 250 to 300° C. for 30 to 60 minutes in an oxidizing atmosphere (e.g. air) is especially preferable as the precalcination conditions in this case.

Furthermore, when obtaining powdered nanoporous metal oxide materials, a method of powdering the heat treated fluid raw material composition without practical coprecipitation after mixing at the high shear rates is preferably adopted. A method to powder the fluid raw material composition is not particularly limited. However, a method of obtaining powdered nanoporous metal oxide materials by drying the fluid raw material composition and further calcination if necessary followed by the grinding of the resultant is preferably adopted.

The nanoporous metal oxide materials of the present invention described so far are compound metal oxides consisted of the binary-component zirconia/ceria containing specified amounts of zirconia and ceria, or compound metal oxides consisted of the triple-component zirconia/ceria/alumina containing specified amounts of zirconia, ceria and alumina. The nanoporous metal oxide materials of the present invention described so far, also preferably satisfy the following condition (I) described below.

The first condition (I) which nanoporous metal oxide materials of the present invention preferably satisfy is as follows. Firstly, spectra for all the metal elements of metal oxides whose content in the nanoporous metal oxide materials is 10 at % or more are measured by energy dispersive X-ray spectroscopy at measuring points in the region where a sample thickness can be regarded as almost constant using transmission electron microscope with electron beam diameter of 1.0 nm and an accelerating voltage of 200 kV. The mean $X_m$ of the relative intensity ratio X derived by converting integrated intensity of fluorescent X-ray peak of each metal element in the obtained spectra to relative ratio, and the second moment $v_2$ around the mean $X_m$ satisfy a condition expressed by the formula (1) described below for all the metal elements.

$$v_2/X_m^2 \leq 0.02 \qquad (1)$$

$X_m$ is the mean of relative intensity ratio X in the formula (1) and is described by the equation below:

$X_m = (\Sigma X)/N$ (N in the equation describes the number of measuring points)

In addition, $v_2$ is the second moment around the mean $X_m$ and is described by the equation below:

$v_2 = \{\Sigma(X-X_m)^2\}/N$

Furthermore, $v_2/X_m^2$ is the second moment normalized to the square of the mean $X_m$.

Although specific methods for such measurements are not particularly limited here, it is preferable to perform measurements with a measuring method described above for example.

<Sample Preparation>

A small amount of nanoporous metal oxide material is sampled and mixed in approximately 5 to 10 ml of dispersing medium (e.g. ethanol) collected in a container. After putting the mixture into a water bath of an ultrasonic cleaner and stirring the mixture by supersonic wave for a few minutes, the container is immediately pulled out from the ultrasonic cleaner. 1 to 2 droplets of the resulting dispersion of sample to be examined are dropped onto a sample stage, which is used exclusively for scanning transmission electron microscope, and with a porous organic membrane pasted on a copper foil mesh of approximately 3 mmΦ called a "microgrid". Additionally, observation is made by using scanning transmission electron microscope after evaporating the dispersing medium completely.

<Transmission Electron Microscopic Observation>

A transmission electron microscope (TEM) with an accelerating voltage of 200 kV and having field-emission gun (FEG) is used for the observation. Use of a TEM equipped with the scanning transmission electron microscope (STEM) observation mode and a detector for energy dispersive X-ray spectroscopy (EDX) is a necessary condition for the measurements. A microgrid with droplets of sample to be examined is inserted into a sample chamber of TEM and the protruding sample on organic membrane pore of the microgrid (namely the part where the sample does not overlap the organic membrane) was made as a subject for observation and element analysis. The part where sample thickness is relatively thin is selected, irradiated with an electron beam focused into 1 nmΦ for 30 seconds in STEM observation mode, fluorescent X-ray emitted from the sample is detected using EDX detector. Additionally, in terms of sample thickness, when the total counts of all the X-ray obtained by EDX detector are made as the standard, the parts where ten thousand counts to sixty thousand counts are achieved are defined as the appropriate regions for measurements; i.e. the regions where the sample thickness can be regarded as almost constant.

<Determination of Measuring Site Quality>

Figure 2:
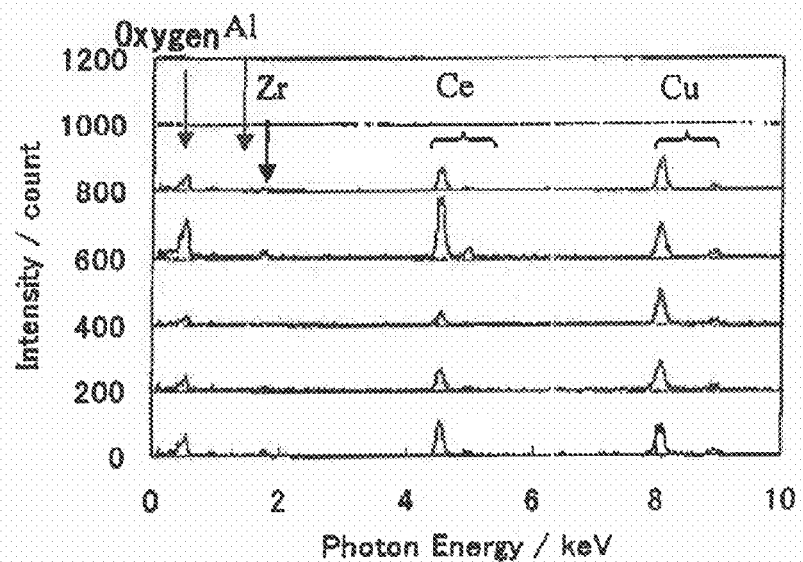
FIG. 2 is a graph showing one example of unsatisfactory measured results of EDX spectra.
Figure 3:
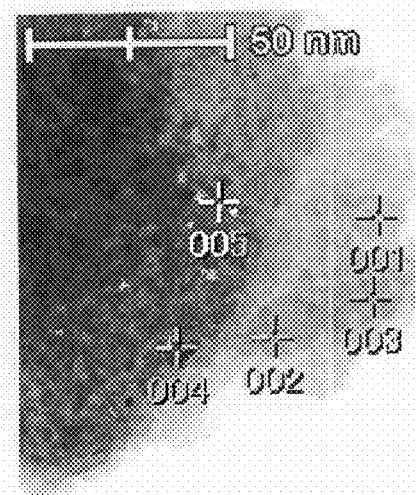
FIG. 3 is a transmission electron micrograph showing a part where element analysis was performed satisfactorily.
Figure 4:
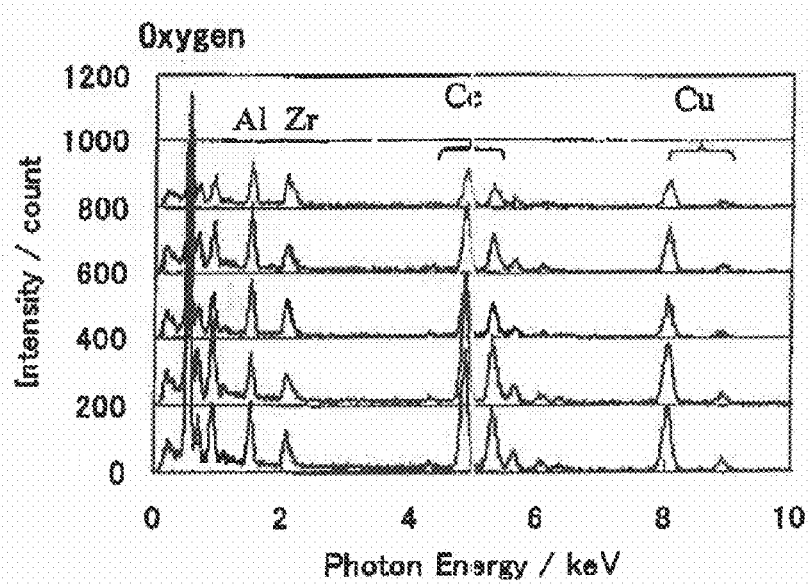
FIG. 4 is a graph showing s satisfactory measuring results of EDX spectra.

There is a part where a measuring site is so close to the copper foil supporting the organic membrane of the microgrid that a part of fluorescent X-ray emitted from the sample hit this copper foil resulting in unpreferable element analysis. EDX detection results obtained from such parts have performances such as (1) low overall counts, (2) low counts especially in the low energy region like fluorescent X-ray of oxygen, and (3) relatively high counts for copper. FIG. 1 shows one example of a scanning electron micrograph (006 to 010 are showing measuring points in the figure) of apart where preferable element analysis is not possible and FIG. 2 shows one example of a poor measurement result of EDX spectra. Measured results from such measuring places are all removed from the subject to be discussed and measurements are continued by having samples in other organic membrane pores as newly measuring targets. For example, in the example described later, measured results obtained from the place where the ratio of (total counts for oxygen) (total counts for copper) in the obtained EDX spectra is less than 2 is removed from the calculation. Calculation described later is done based on the measured results obtained from the place where the ratio of (total counts for oxygen) (total counts for copper) in the obtained EDX spectra is 2 or more. FIG. 3 shows one example of a scanning electron micrograph (001 to 005 are showing measuring points in the figure) of apart where preferable element analysis is performed and FIG. 4 shows one example of a preferable measurement result of EDX spectra.

<Calculation Based on Measured Results>

Before the determination of aforementioned conditions, data of EDX spectra will be used without being modified in the present invention. In other words, calculation will be based on counts of fluorescent X-ray themselves rather than converted numerical values of element weight ratio and so on using some sorts of converting formulae. Firstly, with the EDX spectra, one peak for each metal element is selected from fluorescent X-ray peaks of major metal components constituting the sample for all the metal elements of metal oxides whose content in the sample is 10 at % or more, such as Al, Zr and Ce based on the two flowing points. A peak which has (1) as many counts as possible, and (2) small overlapping parts with other peaks that are negligible. Energy width (approximately 0.2 to 0.3 keV) necessary as well as sufficient for covering all of the selected peaks is then set and all the counts of fluorescent X-ray in this range are summed up and this is derived as the integrated intensity of fluorescent X-ray peak of the metal element. Based on this result, the aforementioned relative intensity ratio X, its mean $X_m$, the second moment $v_2$ around the mean $X_m$, and the second moment $v_2/X_m^2$ normalized to the square of the mean $X_m$ are sequentially calculated, and it is determined whether or not nanoporous metal oxide materials satisfy the condition described by the formula (1) described above.

When the nanoporous metal oxide materials of the present invention satisfy the condition described by the formula (1), it describes the state where major metal oxides forming the nanoporous metal oxide materials are extremely homogeneously dispersed in the wall constituting nanopores. Such extremely high level of component homogeneousness can never be attained with the metal oxides obtained by using colloidal solutions of metal oxides or metal salt solutions as they are. This has only become achievable for the first time by the producing method according to the present invention. In addition, in nanoporous metal oxide materials satisfying the condition described by the formula (1), surprisingly, adhesion to various substrates and heat tolerance are dramatically improved compared to those of conventional porous metal oxide materials which do not satisfy the condition.

Moreover, nanoporous metal oxide materials of the present invention more preferably satisfy at least one of the conditions (II) (more preferably (II')), (III), (IV), and (V) described below. Especially, nanoporous metal oxide materials obtained by using colloidal solutions as fluid raw material composition preferably satisfy at least one of the conditions (II) (more preferably (II')), (III), and (IV), whereas nanoporous metal oxide materials obtained by using metal salt solutions as fluid raw material composition preferably satisfy the condition (V).

Nanoporous metal oxide materials of the present invention preferably satisfy the condition (II) described below.

The second condition (II) which nanoporous metal oxide materials of the present invention preferably satisfy is as follows. A K value calculated by the equation (2) described below derived by arbitrary line analysis of range of 0.5 mm or more for all the metal elements of metal oxides whose contents are 10 at % or more in the nanoporous metal oxide material using X-ray microanalyzer with an electron beam diameter of 1 μm and an accelerating voltage of 15 kV, satisfies the condition expressed by the equation (3) described below for all the metal elements in 65% or more (especially preferably 75% or more) of measuring points out of the total measuring points.

$$K \text{ value (\%)} = (\text{X-ray intensity detected from nanoporous metal oxide material})/(\text{X-ray intensity obtained from pure substance}) \quad (2)$$

$$\frac{|K - Km|}{Km} \leq 0.02 \quad (3)$$

Moreover, the second condition (II') which nanoporous metal oxide materials of the present invention preferably satisfy is as follows. The K value calculated by the equation (2) derived by arbitrary line analysis of range of 0.5 mm or more for all the metal elements of metal oxides whose contents are 5 at % or more in the nanoporous metal oxide material using X-ray microanalyzer with an electron beam diameter of 1 μm and an accelerating voltage of 15 kV, satisfies the condition expressed by the equation (3) for all the metal elements in 40% or more of measuring points out of the total measuring points.

K is the K value (%) at each measuring point and $K_m$ is a mean of K values of all the measuring points, respectively in the equation (3). Moreover, among the measuring points where actual line analysis is performed, the parts corresponding to the cracks formed in the nanoporous metal oxide material are eliminated from the measuring points. Note here that for recognition methods for such cracks, a method to recognize parts as cracks where more than the predetermined amounts of substrate components are detected as a result of measurement by X-ray microanalyzer, or a method to recognize cracks by observation using light or electron microscope is preferably adopted. In addition, X-ray microanalyzer used here is not particularly limited as long as it is normal, wavelength dispersive type of instrument.

When the nanoporous metal oxide materials of the present invention satisfy the condition (II) (preferably condition (II')) described above, it describes the state where major metal oxides forming the nanoporous metal oxide materials are extremely homogeneously dispersed in the nanoporous metal oxide materials. Such extremely high level of component homogeneousness can never be attained with the metal oxides obtained by using colloidal solutions of metal oxides or metal salt solutions as they are. This has only become achievable for the first time by the producing method according to the present invention. In addition, in nanoporous metal oxide materials satisfying the condition (II) (preferably condition (II')) described above, surprisingly, adhesion to various substrates and heat tolerance are dramatically improved compared to those of conventional porous metal oxide materials which do not satisfy the condition (II).

Nanoporous metal oxide materials of the present invention preferably satisfy the condition (III) described below.

The third condition (III) which nanoporous metal oxide materials of the present invention preferably satisfy is as follows. Surface height images of the nanoporous metal oxide materials are measured arbitrarily with a tapping mode by a scanning probe microscope (SPM) using a tip with a curvature radius of 5 nm with an interval of 3 nm or more and less than 4 nm. A height image H(L) derived as a function of scan length L total of 2 μm or more satisfies the condition expressed by the formula (4) described below in 80% or more (especially preferably 90% or more) of measuring points out of the total measuring points.

$$H(L) \leq 20 \text{ nm} \quad (4)$$

[H(L) is a height image (nm) at each measuring point (scan length=L) in the formula (4). Note here that the mean of height images H of all the measuring points is set to zero.]

Moreover, the second derivative H"(L) derived from the formulae (5) and (6) described below satisfies the condition described by the Formula (7) shown below in 60% or less (especially 55% or less) of measuring points out of the total measuring points.

$$H'(L) = \frac{dH}{dL} = \frac{H(L + \Delta L) - H(L)}{\Delta L} \quad (5)$$

$$H''(L) = \frac{d^2 H}{dL^2} = \frac{H'(L + \Delta L) - H'(L)}{\Delta L} \quad (6)$$

[H(L) is a height image (nm) at a measuring point where a scan length=L, H(L+ΔL) is a height image (nm) at a measuring point where a scan length=L+ΔL, ΔL is an interval (nm) among measuring points, H'(L) is a first derivative of a height image H(L), H'(L+ΔL) is a first derivative of a height image H(L+ΔL), and H"(L) is a second derivative of a height image H(L), in the formulae (5) and (6). Note here that ΔL is set to 4 nm by linear interpolation among measuring points.]

$$-0.05 \text{ nm}^{-1} \leq H''(L) \leq 0.05 \text{ nm}^{-1} \quad (7)$$

Note here that no smoothing treatment is performed at the time of the second derivative H"(L) calculation.

When the nanoporous metal oxide materials of the present invention satisfy the first part of the condition (III) described above, it describes the state where height distribution is biased to small parts and the surface has minute irregularities. On the other hand, when the nanoporous metal oxide materials of the present invention satisfy the latter part of the condition (III) described above, it describes the state where the second derivative include a relatively large value and concaves and convexes themselves on the surface are not smooth but further have many highly minute, small protrusions thereon. Such particular surface profiles can never be attained with the metal oxides obtained by using colloidal solutions of metal oxides or metal salt solutions as they are. This has only become achievable for the first time by the producing method according to the present invention. In addition, in nanoporous metal oxide materials satisfying the condition (III) described above, surprisingly, adhesion to various substrates and heat tolerance are dramatically improved compared to those of conventional porous metal oxide materials which do not satisfy the condition (III).

Nanoporous metal oxide materials of the present invention preferably satisfy the condition (IV) described below.

The fourth condition (IV) which nanoporous metal oxide materials of the present invention preferably satisfy is as follows. When a measuring line is drawn arbitrarily for total of 400 μm or more on the nanoporous metal oxide material in the electron micrograph of the section of the nanoporous metal oxide material, length ratio of the part where the measuring line intersect with the void portion (excluding nanopores) formed in the nanoporous metal oxide material satisfies a condition that it is 10% or less (especially preferably 5% or less) of the total length of the measuring line.

When the nanoporous metal oxide materials of the present invention satisfy the condition (IV) described above, it describes the state where appropriate continuity is ensured for metal oxides constituting the nanoporous metal oxide materials and has a small number of voids in the nanoporous metal oxide materials. Such nanoporous metal oxide materials ensured with appropriate continuity and having section profiles with a small number of voids can never be attained with the metal oxides obtained by using conventional slurries. This has only become achievable for the first time by the producing method according to the present invention. In addition, in nanoporous metal oxide materials satisfying the condition (IV) described above, surprisingly, adhesion to various substrates and heat tolerance are improved compared to those of conventional porous metal oxide materials which do not satisfy the condition (IV).

The nanoporous metal oxide materials of the present invention preferably satisfy the condition (V) described below.

The fifth condition (V) which nanoporous metal oxide materials of the present invention preferably satisfy is as follows. Firstly, spectra for all the metal elements of metal oxides whose content in the nanoporous metal oxide materials is 10 at % or more are measured by energy dispersive X-ray spectroscopy at 10 or more arbitral measuring points using transmission electron microscope with electron beam diameter of 1.0 nm and an accelerating voltage of 200 kV. The mean $X_m$ of the relative intensity ratio X derived by converting integrated intensity of fluorescent X-ray peak of each metal element in the obtained spectra to relative ratio, and the second moment $v_2$ around the mean $X_m$ satisfy the condition expressed by the formula (8) described below for all the metal elements.

$$v_2/X_m^2 \leq 0.1 \quad (8)$$

$X_m$ is the mean of relative intensity ratio X in the formula (8) and is described by the equation below:

$$X_m = (\Sigma X)/N \text{ (N in the equation describes the number of measuring points)}$$

In addition, $v_2$ is the second moment around the mean $X_m$ and is described by the equation below:

$$v_2 = \{\Sigma(X - X_m)^2\}/N$$

Furthermore, $v^2/X_m^2$ is the second moment normalized to the square of the mean $X_m$.

Note here that although details (sample preparation, transmission electron microscopic observation, determination of measuring site quality, calculation based on measured results) of determination method of this condition (V) are almost the same as those of determination method of the condition (I), it is not necessary to use measured values from measuring points in the region where the thickness of the sample to be examined can be regarded as almost constant in the determination method of the condition (I) but those from 10 or more measuring points selected arbitrarily. Therefore, in terms of thickness of the sample to be examined, the parts where between ten thousand counts and one hundred and fifty thousand counts are made by taking total counts of all the X-ray obtained by the EDX detector as a standard, can be adopted as appropriate regions for measurements.

When the nanoporous metal oxide materials of the present invention satisfy the condition (V) described above, it describes the state where major metal oxides forming the nanoporous metal oxide materials are extremely homogeneously dispersed in the nanoporous metal oxide materials. Such extremely high level of component homogeneousness can never be attained with the metal oxides obtained by using colloidal solutions of metal oxides or metal salt solutions as they are. This has only become achievable for the first time by the producing method according to the present invention. In addition, in nanoporous metal oxide materials satisfying the condition (V) described above, surprisingly, adhesion to various substrates and heat tolerance are improved compared to those of conventional porous metal oxide materials which do not satisfy the condition.

Nanoporous metal oxide materials according to the present invention preferably satisfy one of the above described conditions (I) to (V) and more preferably satisfy two or more of the conditions (I) to (V). Major metal oxides constituting the nanoporous metal oxide materials, which satisfy a plurality of conditions, are extremely homogeneously dispersed in the nanoporous metal oxide materials (the wall constituting nanopores). Adhesion to various substrates and heat tolerance of the nanoporous metal oxide materials can be further improved synergistically by this homogeneous dispersion.

Catalysts for hydrogen production reaction of the present invention will be described next. Catalysts for hydrogen production reaction of the present invention are characterized by comprising the catalyst supports of the present invention and a noble metal supported on the surface of the catalyst supports.

In the catalysts for hydrogen production reaction of the present invention, a noble metal supported on the surface of the catalyst supports of the present invention are not particularly limited. Platinum, rhodium, palladium, osmium, iridium, gold, and so on can be used and platinum, rhodium and palladium are preferable among them. In addition, the amount of such a noble metal to be supported is not particularly limited and is adjusted depend on the usage of obtained catalysts and so on where appropriate. However, the amount of approximately 0.1 to 10 weight parts relative to 100 weight parts of metal oxides constituting the catalyst supports is generally adopted.

Moreover, specific method to support such a noble metal is not particularly limited. For example, a method firstly immersing the catalyst supports of the present invention in the solution obtained by dissolving a noble metal salt (e.g. nitrate, chloride, acetate) or a noble metal complex in a solvent such as water and alcohol, and then calcinating the resultant after the removal of solvents, is preferably adopted. Note here that drying conditions of 30 to 150° C. for approximately 10 minutes or less and calcination conditions of 250 to 300° C. for approximately 30 to 60 minutes in an oxidizing atmosphere (e.g. air) are preferable when removing solvents in the step to support the noble metal. Additionally, it is possible to repeat such step to support a noble metal until the desired amount is supported.

EXAMPLES

The present invention will be specifically described below based on Examples and Comparative Examples although the present invention is not limited to the Examples described below.

Here, TK Robo Mics manufactured by Tokusyu Kika Kogyo Co., Ltd. (TK Homo Mixer MARKII 2.5 for the stirring parts) was used as a homogenizer.

Moreover, materials described below were respectively used as alumina ($Al_2O_3$) colloid, Al solution, Zr solution, zirconia ($ZrO_2$) powder, Ce solution, and Rh solution.

$Al_2O_3$ colloid . . . average particle size: 5 to 20 nm, acicular particle, nitrate water solution (solid concentration: 25 weight %), Al solution . . . aluminum nitrate water solution (solid concentration: 5.44 weight %)

Zr solution . . . zirconium oxynitrate water solution (solid concentration: 18 weight %)

$ZrO_2$ powder . . . average particle size: 1 µm,

Ce solution . . . cerium nitrate water solution (solid concentration: 28 weight %)

Rh solution . . . rhodium nitrate water solution (solid concentration: 3 weight %)

Additionally, a metal plate made of stainless steel containing chromium and aluminum (Fe-20Cr-5Al, 50 mm×50 mm×0.3 mm) which was heat treated for one hour at 1000° C. in advance to form oxide coating film on the surface thereof, was used as a substrate for evaluating component homogeneousness, surface forms, and heat tolerance. Moreover, a cordierite substrate with honeycomb forms of 400 mesh, and a cordierite substrate with honeycomb forms of 1500 mesh were used as substrate for evaluating cross-section forms. Furthermore, high density metallic honeycomb (Fe-20Cr-5Al) of 1200 cell/inch$^2$ was used as a substrate for the evaluation of reforming performances. Moreover, a cordierite plate (50 mm×50 mm×1 mm), and an SiC plate (50 mm×50 mm×1 mm) were used in addition to the above described metal plate as substrates to evaluate adhesion.

Example 1

$Al_2O_3$ colloid, Zr solution, and Ce solution were mixed so that the weight ratio among $Al_2O_3$, $ZrO_2$, and $CeO_2$ in the coating to be obtained will become $Al_2O_3$: $ZrO_2$: $CeO_2$=35: 30:35, and then diluted with methanol to prepare a colloidal solution with a solid concentration of 12 weight %. Obtained colloidal solution was mixed for 2 minutes with the homogenizer at a shear rate of 20000 sec$^{-1}$, and then gently mixed (stirring rate of 20 rpm) for about one minute to remove air bubbles from the resulting colloidal solution thereby to obtain a coating composition.

Subsequently, each of the substrates was immediately immersed in the obtained coating composition described above for 1 to 10 seconds and excessive coating composition was removed by gravity and shaking after the pulling out of the substrate. After being placed horizontally, the substrate was gently dried at room temperature for 5 to 10 minutes, dried with warm air (60 to 100° C.) at a wind velocity of 2 to 5 m/s for 5 to 10 minutes, precalcinated at 250° C. for approximately 30 minutes in the air atmosphere, and further cooled for 5 to 10 minutes with normal temperature air at a wind velocity of 2 to 5 m/s. After repeating such treatments twice, the substrates were calcinated for approximately 60 minutes at 500° C. in the air atmosphere, and the catalyst supports with metal oxide coating formed on the substrate surface were obtained.

When the metal oxide coating in the obtained catalyst supports was observed by a transmission electron microscope (TEM), coating film thickness of approximately 4 µm and the formation of thin film made of highly homogeneous metal oxides were confirmed.

Comparative Example 1

Catalyst supports forming metal oxide coating on the substrate surface were obtained as the same manner as that described in Example 1 except the gentle stirring by a propeller (a shear rate of 10 sec$^{-1}$ or lower) instead of mixing using a homogenizer.

Comparative Example 2

Firstly, conventional alumina/ceria/zirconia compound oxide powder was obtained by coprecipitation method described in Example 1 of Japanese Patent Application Laid-Open Gazettes No. Hei. 10-182155 (Document 1). Catalyst supports forming metal oxide coating on the substrate surface were obtained as the same manner as that described in Example 1 except that a slurry with a mixed solid concentration of 70 weight % containing conventional alumina/ceria/zirconia compound oxide powder, boehmite, and aluminum nitrate was used instead of the colloidal solution so that the weight ratio among $Al_2O_3$, $ZrO_2$, and $CeO_2$ in the metal oxide thin film to be obtained will become $Al_2O_3$: $ZrO_2$: $CeO_2$=35: 30:35, the gentle stirring by a propeller (a shear rate of 10 sec$^{-1}$ or lower) instead of the mixing using the homogenizer, and the setting of calcination temperature to 700° C.

Examples 2 to 5 and Comparative Examples 3 to 8

Figure 5:
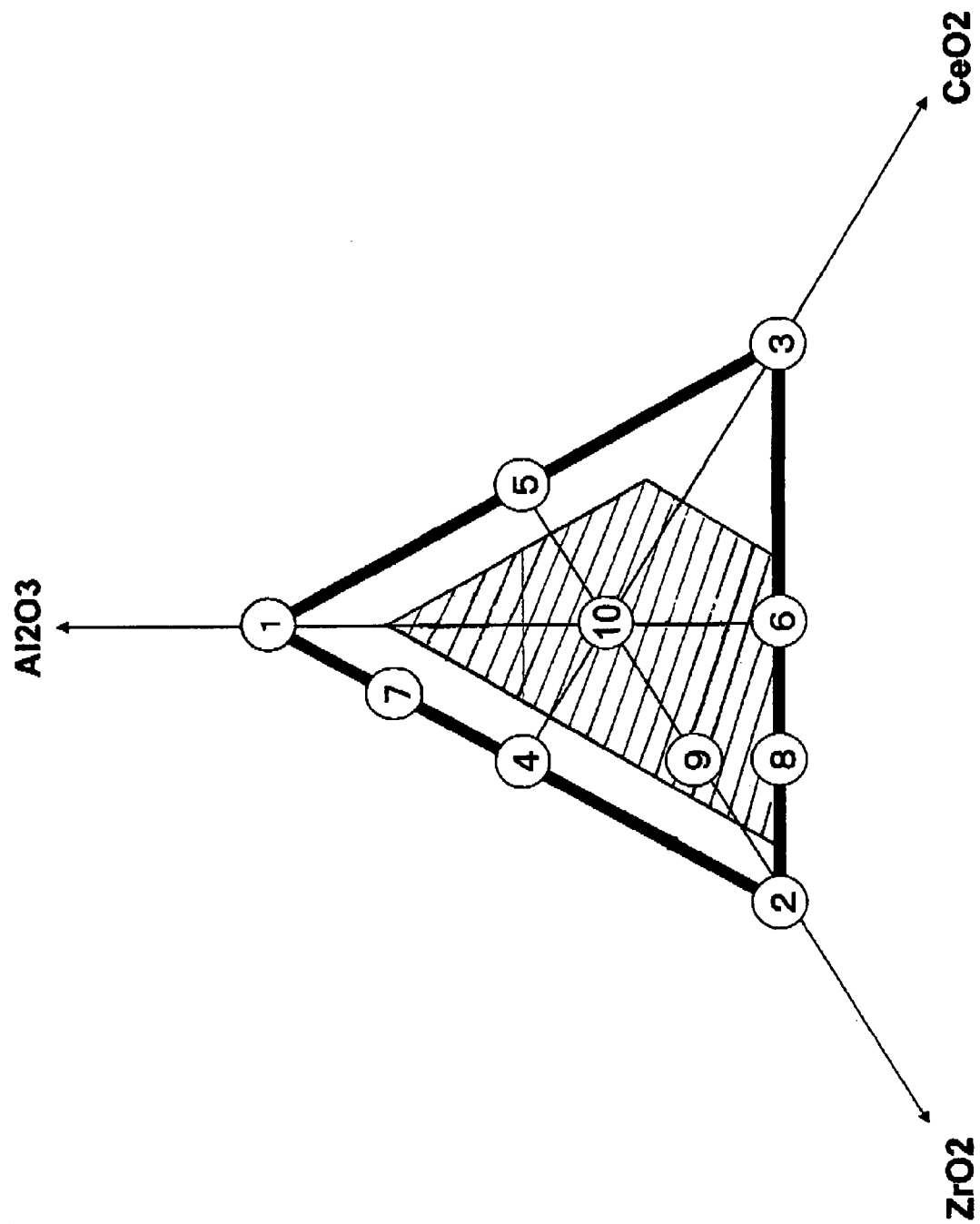
FIG. 5 is a ternary diagram showing coating composition obtained by the methods in Examples 2 to 5 and Comparative Examples 3 to 8.

Catalyst supports forming metal oxide coating on the substrate surface were obtained as the same manner as that described in Example 1 except the mixing of $Al_2O_3$ colloid, Zr solution, $ZrO_2$ powder, and Ce solution in the proportion (weight ratio) shown in Table 1. Note that compositions (composition No. shown in Table 1) of the coatings obtained in Examples 2 to 5 and Comparative Examples 3 to 8 are shown in FIG. 5. Shaded parts in FIG. 5 correspond to the composition of nanoporous metal oxide materials in the catalyst supports of the present invention.

TABLE 1

| Example/Comparative Example | Composition No. | Al$_2$O$_3$ colloid | Zr solution | ZrO$_2$ powder | Ce solution |
|---|---|---|---|---|---|
| Comparative Example 3 | 1 | 100 | | | |
| Comparative Example 4 | 2 | | 45 | 55 | |
| Comparative Example 5 | 3 | | | | 100 |
| Comparative Example 6 | 4 | 50 | 22.5 | 27.5 | |
| Comparative Example 7 | 5 | 50 | | | 50 |
| Example 2 | 6 | | 22.5 | 27.5 | 50 |
| Comparative Example 8 | 7 | 25 | 33.75 | 41.25 | |
| Example 3 | 8 | | 33.75 | 41.25 | 25 |
| Example 4 | 9 | 15 | 28.35 | 34.65 | 22 |
| Example 5 | 10 | 35 | 13.5 | 16.5 | 35 |

Comparative Example 9

Catalyst supports forming metal oxide coating on the substrate surface were obtained as the same manner as that described in Example 5 except the gentle stirring by a propeller (a shear rate of 10 sec$^{-1}$ or lower) instead of the mixing using the homogenizer.

Example 6

Catalyst supports forming metal oxide coating on the substrate surface were obtained as the same manner as that described in Example 1 except the mixing of Al$_2$O$_3$ colloid, Zr solution, and Ce solution so that the weight ratio among Al$_2$O$_3$, ZrO$_2$, and CeO$_2$ in the metal oxide thin film to be obtained will become Al$_2$O$_3$: ZrO$_2$: CeO$_2$=40:40:20.

Example 7

Catalyst supports forming metal oxide coating on the substrate surface were obtained as the same manner as that described in Example 6 except the setting of shear rate to 10000 sec$^{-1}$ at the time of the mixing by the homogenizer.

Example 8

Catalyst supports forming metal oxide coating on the substrate surface were obtained as the same manner as that described in Example 6 except the setting of shear rate to 4000 sec$^{-1}$ at the time of the mixing by the homogenizer.

Comparative Example 10

Catalyst supports forming metal oxide coating on the substrate surface were obtained as the same manner as that described in Example 6 except the gentle stirring by a propeller (a shear rate of 10 sec$^{-1}$ or lower) instead of the mixing using the homogenizer.

Example 9

Al$_2$O$_3$ colloid, Zr solution, and Ce solution were mixed so that the weight ratio among Al$_2$O$_3$, ZrO$_2$, and CeO$_2$ in the metal oxide powder to be obtained will become Al$_2$O$_3$: ZrO$_2$: CeO$_2$=40:40:20, and then diluted with methanol to prepare a colloidal solution with a solid concentration of 12 weight %. Obtained colloidal solution was mixed for 2 minutes with the homogenizer at a shear rate of 20000 sec$^{-1}$, and then gently mixed (stirring rate of 20 rpm) for about one minute to remove air bubbles from the resulting colloidal solution thereby to obtain a coating composition.

Subsequently, obtained coating composition was heated to 150° C. to remove water vapor and after further heating to 250° C. to remove nitrate component, metal oxide powder with average particle size of approximately 70 μm was obtained by grinding the resultant in a mortar.

Comparative Example 11

Metal oxide powdered material was obtained as the same manner as that described in Example 9 except the gentle stirring by a propeller (a shear rate of 10 sec$^{-1}$ or lower) instead of the mixing using the homogenizer.

Example 10

55.2 g of Al solution, 16.7 g of Zr solution, and 14.3 g of Ce solution were mixed with 13.9 g of methanol so that the weight ratio among Al$_2$O$_3$, ZrO$_2$, and CeO$_2$ in the coating to be obtained will become Al$_2$O$_3$: ZrO$_2$: CeO$_2$=30:30:40 to prepare a metal salt solution with a solid concentration of 10 weight %. Obtained metal salt solution was mixed for 2 minutes with the homogenizer at a shear rate of 20000 sec$^{-1}$, and then gently mixed (stirring rate of 20 rpm) for about one minute to remove air bubbles from the resulting colloidal solution thereby to obtain a coating composition.

Subsequently, a metal plate already forming oxide coating film on its surface by heat treatment for one hour at 1000° C. in advance was immediately immersed in the obtained coating composition described above for 1 to 10 seconds and then excessive coating composition on the plate surface was removed by gravity and shaking after the plate was pulled out. After being placed horizontally, the plate was gently dried at room temperature for 5 to 10 minutes, dried with warm air (60 to 100° C.) at a wind velocity of 2 to 5 m/s for 5 to 10 minutes, precalcinated at 250° C. for approximately 30 minutes in the air atmosphere, and further cooled for 5 to 10 minutes with normal temperature air at a wind velocity of 2 to 5 m/s. After repeating such treatments twice, the plate was calcinated for approximately 60 minutes at 500° C. in the air atmosphere, and the catalyst supports with the amount of approximately 0.2 g of metal oxide coating per one evaluation plate were obtained.

Approximately 4 μm of coating film thickness and the formation of thin film made of highly homogeneous metal oxides were confirmed when observing metal oxide coating in the obtained catalyst supports by transmission electron microscope (TEM).

Comparative Example 12

Catalyst supports forming metal oxide coating on substrate surface thereof were obtained as the same manner as that described in Example 10 except the gentle stirring by a propeller (a shear rate of 10 sec$^{-1}$ or lower) instead of the mixing using the homogenizer.

Example 11

Catalyst supports forming metal oxide coating on substrate surface thereof were obtained as the same manner as that described in Example 10 except the mixing of Al solution, Zr solution, and Ce solution so that the weight ratio among Al$_2$O$_3$, ZrO$_2$, and CeO$_2$ in the metal oxide thin film to be obtained will become Al$_2$O$_3$: ZrO$_2$: CeO$_2$=40:40:20.

Comparative Example 13

Catalyst supports forming metal oxide coating on substrate surface thereof were obtained as the same manner as that described in Example 11 except the gentle stirring by a propeller (a shear rate of 10 sec$^{-1}$ or lower) instead of the mixing using the homogenizer.

Example 12

Catalyst supports forming metal oxide coating on substrate surface thereof were obtained as the same manner as that described in Example 10 except the setting of shear rate to 10000 sec$^{-1}$ at the time of the mixing by the homogenizer.

Example 13

Catalyst supports forming metal oxide coating on substrate surface thereof were obtained as the same manner as that described in Example 10 except the setting of shear rate to 4000 sec$^{-1}$ at the time of the mixing with the homogenizer.

Example 14

55.2 g of Al solution, 16.7 g of Zr solution, and 14.3 g of Ce solution were mixed with 13.9 g of methanol so that the weight ratio among $Al_2O_3$, $ZrO_2$, and $CeO_2$ in the coating to be obtained will become $Al_2O_3$: $ZrO_2$: $CeO_2$=30:30:40 to prepare a metal salt solution with a solid concentration of 10 weight %. Obtained metal salt solution was mixed for 2 minutes with the homogenizer at a shear rate of 20000 sec$^{-1}$, and then gently mixed (stirring rate of 20 rpm) for about one minute to remove air bubbles from the resulting colloidal solution thereby to obtain a coating composition.

Obtained coating composition was then applied onto a high temperature plate heated to 300 to 350° C., and metal oxide powdered material with average particle size of approximately 70 µm was obtained by drying (removal of solvents) and calcinating (removal of nitrate component as well as oxidation of metal components) the resulting plate for 30 minutes, followed by grinding of the resultant in a mortar.

Comparative Example 14

Metal oxide powdered materials were obtained as the same manner as that described in Example 14 except the gentle stirring of the metal salt solution by a propeller (a shear rate of 10 sec$^{-1}$ or lower) instead of mixing using a homogenizer.

Example 15

Compound metal oxide powdered materials were obtained as the same manner as that described in Example 14 except the drying and calcinating the coating composition at 500° C. in the air atmosphere spending 3 to 4 hours.

Comparative Example 15

Compound metal oxide powdered materials were obtained as the same manner as that described in Example 15 except the gentle stirring of the metal salt solution by a propeller (a shear rate of 10 sec$^{-1}$ or lower) instead of mixing using a homogenizer.

<Evaluation of Component Homogeneousness 1: Condition (I)>

Firstly, component homogeneousness was evaluated as follows for metal oxide coatings obtained by the methods described in Examples 1, 6, and 11 and Comparative Examples 1, 10, and 13 and metal oxide powdered materials obtained by the methods described in Examples 9 and 14 and Comparative Examples 2, 11, and 14. That is, according to the aforementioned measuring method of the condition (I), spectra were measured for these metal oxide coatings and metal oxide powdered materials by energy dispersive X-ray spectroscopy using a transmission electron microscope (JEM2010FEF manufactured by JEOL Ltd.) with electron beam diameter of 1.0 nm and an accelerating voltage of 200 kV and integrated intensity of fluorescent X-ray peak for Al, Zr, and Ce contained in the thin film was calculated.

Note here that in terms of sample thickness, when the total counts of all the X-ray obtained by EDX detector were made as the standard, the parts where ten thousand counts to sixty thousand counts are achieved were adopted as the appropriate regions for measurements; i.e. the regions where the sample thickness can be regarded as almost constant.

Based on this measured result, the aforementioned relative intensity ratio X, its mean $X_m$, the second moment $v_2$ around the mean $X_m$, and the second moment $v_2/X_m^2$ normalized to the square of the mean $X_m$ are sequentially calculated, and it is determined whether or not the condition described by the formula (1) described above is satisfied.

The obtained second moment $v_2/X_m^2$ normalized to the square of the mean $X_m$ in such a way is shown respectively in Table 2.

TABLE 2

| | Second moment normalized to the square of mean | | |
|---|---|---|---|
| | Al | Zr | Ce |
| Example 1 | 0.0130 | 0.0080 | 0.0100 |
| Comparative Example 1 | 0.0280 | 0.0160 | 0.0070 |
| Example 6 | 0.0099 | 0.0181 | 0.0090 |
| Comparative Example 10 | 0.0185 | 0.0373 | 0.0223 |
| Example 9 | 0.0068 | 0.0186 | 0.0192 |
| Comparative Example 11 | 0.0712 | 0.2448 | 0.4100 |
| Example 11 | 0.0110 | 0.0199 | 0.0019 |
| Comparative Example 13 | 0.1451 | 0.2668 | 0.0910 |
| Example 14 | 0.0040 | 0.0140 | 0.0170 |
| Comparative Example 14 | 0.0160 | 0.0270 | 0.0010 |
| Comparative Example 2 | 0.3220 | 0.1060 | 0.1420 |

As is apparent from the results shown in Table 2, all the metal elements contained in metal oxides satisfied the condition described by the formula (1) for metal oxide coatings obtained in Examples 1, 6, and 11 and metal oxide powdered materials obtained in Examples 9 and 14 obtained by the method of the present invention, and thus, the extremely homogeneous dispersion of metal oxides was confirmed. On the other hand, in metal oxide coatings obtained in Comparative Examples 1, 10, and 13 and metal oxide powdered materials obtained in Comparative Examples 11 and 14 where the mixing at a high shear rate was not performed, it was confirmed that all the metal elements contained in powdered materials did not satisfy the condition described by the formula (1) described above. Furthermore, even in conventional alumina/ceria/zirconia compound oxide powder obtained by conventional coprecipitation method obtained in Comparative Example 2, it was confirmed that most metal elements contained in powdered materials did not satisfy the condition described by the formula (1) described above.

<Evaluation of Component Homogeneousness 2: Condition (II)>

Firstly, component homogeneousness was evaluated as follows for metal oxide coating (film thickness: approximately 5 µm) formed on the surface of the metal plate by the method described in Example 1. In other words, two measuring lines of 0.5 mm were arbitrarily set (measuring line 1 and measuring line 2) on the surface of the coating obtained in Example 1. The line analysis was then performed for Al, Zr, and Ce contained in the coating and for Fe contained in the substrate at measuring points on the measuring lines using X-ray microanalyzer (JXA-8200 manufactured by JEOL Ltd.) with electron beam diameter of 1 µm and an accelerating voltage of 15 kV, and K values at each measuring point, the mean ($K_m$) of K values from all the measuring points and values of $\{|K-K_m|/K_m\}$ at each measuring point were calculated. Note here that the determination was made based on whether Fe contained in the substrate was detected or not for the parts corresponding to cracks. Obtained results for the measuring line 1 are shown in Table 3 and obtained results for the measuring line 2 are shown in Table 4, respectively.

TABLE 3

|    | Mean $K_m$ K-value (%) | Proportion of value $|K - K_m|/K_m$ being 0.02 or less (%) |
|----|------------------------|-------------------------------------------------------------|
| Ce | 25.0                   | 78.2                                                        |
| Al | 15.7                   | 75.2                                                        |
| Zr | 16.6                   | 87.1                                                        |

TABLE 4

|    | Mean $K_m$ K-value (%) | Proportion of value $|K - K_m|/K_m$ being 0.02 or less (%) |
|----|------------------------|-------------------------------------------------------------|
| Ce | 25.1                   | 90.8                                                        |
| Al | 16.2                   | 80.7                                                        |
| Zr | 16.7                   | 90.8                                                        |

As is apparent from the results shown in Tables 3 and 4, all the metal elements contained in the coating satisfied the condition described by the formula (3) in 65% or more of the total measuring points in the metal oxide coating obtained in Example 1 obtained by rapidly drying and calcinating the substrate applied with a colloidal solution mixed at a high shear rate. Thus, the extremely homogeneous dispersion of metal oxides was confirmed.

Component homogeneousness was evaluated as described above for metal oxide coatings (film thickness: approximately 5 µm) formed on the surface of the metal plate by the method described in Comparative Example 1. In other words, two measuring lines of 0.5 mm were arbitrarily set (measuring line 1 and measuring line 2) on the surface of the coating obtained in Comparative Example 1. The line analysis was then performed for Al, Zr, and Ce contained in the coating and for Fe contained in the substrate as described above and K values at each measuring point, the mean ($K_m$) of K values from all the measuring points and values of $\{|K-K_m|/K_m\}$ at each measuring point were calculated. Obtained results for the measuring line 1 are shown in Table 5 and obtained results for the measuring line 2 are shown in Table 6, respectively.

TABLE 5

|    | Mean $K_m$ K-value (%) | Proportion of value $|K - K_m|/K_m$ being 0.02 or less (%) |
|----|------------------------|-------------------------------------------------------------|
| Ce | 23.9                   | 56.8                                                        |
| Al | 16.8                   | 52.3                                                        |
| Zr | 16.5                   | 67.0                                                        |

TABLE 6

|    | Mean $K_m$ K-value (%) | Proportion of value $|K - K_m|/K_m$ being 0.02 or less (%) |
|----|------------------------|-------------------------------------------------------------|
| Ce | 23.3                   | 58.0                                                        |
| Al | 16.5                   | 79.0                                                        |
| Zr | 16.5                   | 85.2                                                        |

As is apparent from the results shown in Tables 5 and 6, in the metal oxide coating obtained in Comparative Example 1 where a colloidal solution was used as it is, it was confirmed that at least for a part of metal elements contained in the coating, proportion of measuring points satisfying the condition described by the formula (3) was lower than 65%.

Component homogeneousness was then evaluated as described above for metal oxide coatings (film thickness: approximately 40 µm) formed on the surface of the metal plate by the method described in Comparative Example 2. Note here that metal oxide coating formed on the metal plate by the method described in Comparative Example 2 clearly had inferior adhesion to substrates and the coating covering the substrate was obtained only when the film thickness was set to approximately 40 µm. In other words, two measuring lines of 0.5 mm were arbitrarily set (measuring line 1 and measuring line 2) on the surface of the metal oxide coating obtained in Comparative Example 2. The line analysis was then performed for Al, Zr, and Ce contained in the coating and for Fe contained in the substrate as described above and K values at each measuring point, the mean ($K_m$) of K values from all the measuring points and values of $\{|K-K_m|/K_m\}$ at each measuring point were calculated. Obtained results for the measuring line 1 are shown in Table 7 and obtained results for the measuring line 2 are shown in Table 8, respectively.

TABLE 7

|    | Mean $K_m$ K-value (%) | Proportion of value $|K - K_m|/K_m$ being 0.02 or less (%) |
|----|------------------------|-------------------------------------------------------------|
| Ce | 23.2                   | 24.1                                                        |
| Al | 17.0                   | 10.7                                                        |
| Zr | 14.4                   | 6.3                                                         |

TABLE 8

|    | Mean $K_m$ K-value (%) | Proportion of value $|K - K_m|/K_m$ being 0.02 or less (%) |
|----|------------------------|-------------------------------------------------------------|
| Ce | 23.5                   | 25.0                                                        |
| Al | 15.5                   | 4.5                                                         |
| Zr | 13.5                   | 2.7                                                         |

As is apparent from the results shown in Tables 7 and 8, in the metal oxide coating obtained in Comparative Example 2 where a slurry containing conventional alumina/ceria/zirconia compound oxide powder obtained by the coprecipitation method was used as it is, it was confirmed that for all the metal elements contained in the coating, proportion of measuring points satisfying the condition described by the formula (3) was lower than 65%.

<Evaluation of Surface Profiles: Condition (III)>

Firstly, surface profiles were evaluated as follows for metal oxide coating (film thickness: approximately 5 µm) formed on the surface of the metal plate by the method described in Example 1. In other words, a measuring line of 2 µm was arbitrarily set (512 points measured, 3.91 nm interval) on the surface of the metal oxide coating obtained in Example 1. Surface height images of the coating were measured by the tapping mode using super sharp tip with a curvature radius of 5 nm by the use of scanning probe microscope (NanoScope IIIa manufactured by Digital Instruments Co., Ltd. equipped with a Q control module manufactured by NanoAnalytics), and the height image H(L) as a function of scan length L as well as its second derivative H"(L) were calculated. As a result, in the metal oxide coating obtained in Example 1 obtained by rapidly drying and calcinating the substrate applied with a colloidal solution mixed at a high shear rate, it was confirmed that height image H(L) was 20 nm or less in 94% of all the measuring points and coating surface was having minute irregularities. Moreover, in the metal oxide coating obtained in Example 1, it was confirmed that the proportion of measuring points where an absolute value of the second derivative H"(L) was 0.05 nm$^{-1}$ or less was 54% and that concaves and convexes on the coating surface further have many highly minute, small protrusions thereon.

Surface profiles were then evaluated as described above for metal oxide coating (film thickness: approximately 5 µm)

formed on the surface of the metal plate by the method described in Comparative Example 1. In other words, surface height images of the metal oxide coating obtained in Comparative Example 1 were measured as described above, and the height image H(L) as a function of scan length L as well as its second derivative H"(L) were calculated. As a result, in the metal oxide coating obtained in Comparative Example 1 obtained by using a colloidal solution as it is, it was confirmed that although height image H(L) was 20 nm or less in 94% of all the measuring points, the proportion of measuring points where the absolute value of the second derivative H"(L) was 0.05 nm$^{-1}$ or less was 70 weight % and that concaves and convexes on the coating surface were relatively smooth.

Surface profiles were then evaluated as described above for metal oxide coating (film thickness: approximately 40 μm) formed on the surface of the metal plate by the method described in Comparative Example 2. In other words, surface height images of the metal oxide coating obtained in Comparative Example 2 were measured as described above, and the height image H(L) as a function of scan length L as well as its second derivative H"(L) were calculated. As a result, in the metal oxide coating obtained in Comparative Example 2 where a slurry containing conventional alumina/ceria/zirconia compound oxide powder obtained by the coprecipitation method was used as it is, it was confirmed that the proportion of measuring points where the height image H(L) was 20 nm or less was 44% and the proportion of measuring points where the absolute value of the second derivative H"(L) was 0.05 nm$^{-1}$ or less was 61%, and that the coating had a relatively smooth and large irregularities on its surface.

<Evaluation of Section Profiles: Condition (IV)>

Firstly, section profiles were evaluated as follows for metal oxide coating formed on the edge part of the cordierite substrate with honeycomb forms of 400 mesh and obtained by the method described in Example 1. In other words, four measuring lines (lines 1 to 4) were drawn for total of 465.5 μm on the coating in the electron micrograph of the section of the metal oxide coating obtained in Example 1 and the length ratio of the part where these measuring lines are intersecting with the void portion formed in the coating was calculated. As a result, in the metal oxide coating obtained in Example 1 obtained by rapidly drying and calcinating the substrate applied with a colloidal solution mixed at a high shear rate, it was confirmed that the length ratio of the part where the measuring line was intersecting with the void portion was 4.3% and continuity was ensured in the metal oxides constituting the coating and that the number of voids in the coating was small.

Section profiles were evaluated as described above for metal oxide coating formed on the edge part of the cordierite substrate with honeycomb forms of 400 mesh and obtained by the method described in Comparative Example 2. In other words, four measuring lines (lines 1 to 4) were drawn for total of 556.0 μm on the coating in the electron micrograph of the section of the metal oxide coating obtained in Comparative Example 2 and the length ratio of the part where these measuring lines are intersecting with the void portion formed in the coating was calculated. As a result, in the metal oxide coating obtained in Comparative Example 2 where a slurry containing conventional alumina/ceria/zirconia compound oxide powder obtained by the coprecipitation method was used as it is, it was confirmed that the length ratio of the part where the measuring line was intersecting with the void portion was 42.4% and the number of voids in the coating was large.

<Evaluation of Component Homogeneousness 3: Condition (V)>

Firstly, component homogeneousness was evaluated as follows for metal oxide powdered material obtained by the methods described in Example 14. In other words, according to the aforementioned measuring method, spectra were measured at measuring points (10 parts where element analysis was performed satisfactory) on the transmission electron micrograph of the metal oxide powdered material obtained in Example 14 by energy dispersive X-ray spectroscopy using a transmission electron microscope (JEM2010FEF manufactured by JEOL Ltd.) with electron beam diameter of 1.0 nm and an accelerating voltage of 200 kV, and integrated intensity of fluorescent X-ray peak for Al, Zr, and Ce contained in the powdered material was calculated. Additionally, based on the measured result, the aforementioned relative intensity ratio X, its mean $X_m$, the second moment $v_2$ around the mean $X_m$, and the second moment $v_2/X_m^2$ normalized to the square of the mean $X_m$ were sequentially calculated, and it was determined whether or not the condition described by the formula (8) described above was satisfied.

Relative intensity ratio X of the fluorescent X-ray peak obtained for metal oxide powdered material of Example 14 in each measuring point (Homo-01 to Homo-10) is shown in Table 9 and the obtained second moment $v^2/X_m^2$ normalized to the square of the mean $X_m$ for the same sample is shown in Table 10, respectively.

TABLE 9

|    | Homo-01 | Homo-02 | Homo-03 | Homo-04 | Homo-05 |
|----|---------|---------|---------|---------|---------|
| Al | 0.311   | 0.317   | 0.306   | 0.209   | 0.246   |
| Zr | 0.332   | 0.226   | 0.290   | 0.207   | 0.213   |
| Ce | 0.357   | 0.457   | 0.404   | 0.584   | 0.541   |

|    | Homo-06 | Homo-07 | Homo-08 | Homo-09 | Homo-10 |
|----|---------|---------|---------|---------|---------|
| Al | 0.332   | 0.340   | 0.348   | 0.359   | 0.419   |
| Zr | 0.375   | 0.399   | 0.339   | 0.303   | 0.299   |
| Ce | 0.293   | 0.261   | 0.313   | 0.338   | 0.282   |

TABLE 10

| | Second moment normalized to the square of mean | | |
|---|---|---|---|
| | Example 14 | Comparative Example 14 | Comparative Example 2 |
| Al | 0.030 | 0.427 | 0.183 |
| Zr | 0.045 | 0.426 | 0.099 |
| Ce | 0.076 | 0.239 | 0.156 |

As is apparent from the results shown in Table 10, all the metal elements contained in the powdered material satisfied the condition described by the formula (8) for metal oxide powdered material obtained in Example 14 obtained by rapidly drying and calcinating the metal salt solution mixed at a high shear rate, and thus, the extremely homogeneous dispersion of metal oxides in the powdered material was confirmed.

Component homogeneousness was then evaluated as described above for metal oxide powdered material obtained by the method described in Comparative Example 14. In other words, spectra were measured by energy dispersive X-ray spectroscopy at measuring points (15 parts where element analysis was performed satisfactory) for metal oxide powdered material obtained in Comparative Example 14, and integrated intensity of fluorescent X-ray peak for Al, Zr, and Ce contained in the powdered material was calculated. Additionally, based on the measured result, the aforementioned relative intensity ratio X, its mean $X_m$, the second moment $v_2$ around the mean $X_m$, and the second moment $v^2/X_m^2$ normalized to the square of the mean $X_m$ were sequentially calculated, and it was determined whether or not the condition described by the formula (8) described above was satisfied.

Relative intensity ratio X of the fluorescent X-ray peak obtained for metal oxide powdered material of Comparative Example 14 in each measuring point (Non-Homo-01 to Non-Homo-15) is shown in Table 11 and the obtained second moment $v_2/X_m^2$ normalized to the square of the mean $X_m$ for the same sample is shown in Table 10, respectively.

TABLE 11

|   | Non-Homo-01 | Non-Homo-02 | Non-Homo-03 | Non-Homo-04 | Non-Homo-05 |
|---|---|---|---|---|---|
| Al | 0.121 | 0.096 | 0.258 | 0.264 | 0.105 |
| Zr | 0.100 | 0.109 | 0.352 | 0.482 | 0.110 |
| Ce | 0.779 | 0.795 | 0.390 | 0.254 | 0.785 |

|   | Non-Homo-06 | Non-Homo-07 | Non-Homo-08 | Non-Homo-09 | Non-Homo-10 |
|---|---|---|---|---|---|
| Al | 0.108 | 0.113 | 0.099 | 0.133 | 0.122 |
| Zr | 0.140 | 0.129 | 0.154 | 0.166 | 0.132 |
| Ce | 0.752 | 0.758 | 0.747 | 0.700 | 0.747 |

|   | Non-Homo-11 | Non-Homo-12 | Non-Homo-13 | Non-Homo-14 | Non-Homo-15 |
|---|---|---|---|---|---|
| Al | 0.379 | 0.140 | 0.409 | 0.570 | 0.266 |
| Zr | 0.545 | 0.097 | 0.489 | 0.281 | 0.221 |
| Ce | 0.076 | 0.763 | 0.102 | 0.149 | 0.513 |

As is apparent from the results shown in Table 10, it was confirmed that all the metal elements contained in the powdered material did not satisfy the condition described by the formula (8) for metal oxide powdered material obtained in Comparative Example 14 obtained by using the metal salt solution as it was.

Component homogeneousness was then evaluated as described above for conventional alumina/ceria/zirconia compound oxide powder obtained by conventional coprecipitation method in Comparative Example 2. In other words, spectra were measured by energy dispersive X-ray spectroscopy at measuring points (15 parts where element analysis was performed satisfactory) for metal oxide powdered material obtained in Comparative Example 2, and integrated intensity of fluorescent X-ray peak for Al, Zr, and Ce contained in the powdered material was calculated. Additionally, based on the measured result, the aforementioned relative intensity ratio X, its mean $X_m$, the second moment $v_2$ around the mean $X_m$, and the second moment $v_2/X_m^2$ normalized to the square of the mean $X_m$ were sequentially calculated, and it was determined whether or not the condition described by the formula (8) described above was satisfied.

Relative intensity ratio X of the fluorescent X-ray peak obtained for metal oxide powdered material of Comparative Example 2 in each measuring point (Coprecipitation-01 to Coprecipitation-15) is shown in Table 12 and the obtained second moment $v_2/X_m^2$ normalized to the square of the mean $X_m$ for the same sample is shown in Table 10, respectively.

As is apparent from the results shown in Table 10, it was confirmed that most of the metal elements contained in the powdered material did not satisfy the condition described by the formula (8) even for conventional alumina/ceria/zirconia compound oxide powder obtained by conventional coprecipitation method.

<Evaluation of Component Homogeneousness 4>

Component homogeneousness was evaluated as follows for metal oxide coatings formed on the surface of the metal plate by the method described in Examples 10, 12, and 13 and Comparative Example 12. In other words, a measuring line of 0.5 mm was arbitrarily set on the surface of the metal oxide coatings obtained in Examples 10, 12, 13 and Comparative Example 12. The line analysis was then performed for Al, Zr, and Ce contained in the coating and for Fe contained in the substrate at measuring points on the measuring line using X-ray microanalyzer (JXA-8200 manufactured by JEOL Ltd.) with electron beam diameter of 1 μm and an accelerating voltage of 15 kV, and K values at each measuring point, the mean ($K_m$) of K values from all the measuring points and values of $\{|K-K_m|/K_m\}$ at each measuring point were calculated. Note here that the determination was made on the basis of whether Fe contained in the substrate was detected or not for the parts corresponding to cracks. Obtained results are shown in Table 13 and FIG. 6.

TABLE 12

|   | Coprecipitation-01 | Coprecipitation-02 | Coprecipitation-03 | Coprecipitation-04 | Coprecipitation-05 |
|---|---|---|---|---|---|
| Al | 0.712 | 0.814 | 0.409 | 0.268 | 0.418 |
| Zr | 0.203 | 0.141 | 0.372 | 0.477 | 0.380 |
| Ce | 0.086 | 0.045 | 0.219 | 0.255 | 0.203 |

|   | Coprecipitation-06 | Coprecipitation-07 | Coprecipitation-08 | Coprecipitation-09 | Coprecipitation-10 |
|---|---|---|---|---|---|
| Al | 0.257 | 0.130 | 0.332 | 0.592 | 0.460 |
| Zr | 0.464 | 0.536 | 0.428 | 0.265 | 0.364 |
| Ce | 0.279 | 0.334 | 0.241 | 0.143 | 0.176 |

|   | Coprecipitation-11 | Coprecipitation-12 | Coprecipitation-13 | Coprecipitation-14 | Coprecipitation-15 |
|---|---|---|---|---|---|
| Al | 0.656 | 0.447 | 0.363 | 0.462 | 0.204 |
| Zr | 0.203 | 0.260 | 0.383 | 0.366 | 0.448 |
| Ce | 0.141 | 0.293 | 0.253 | 0.172 | 0.349 |

TABLE 13

| Shear rate | Proportion of value $|K - K_m|/K_m$ being 0.1 or less (%) | | | Mean $K_m$ (%) | | |
|---|---|---|---|---|---|---|
| | Ce | Al | Zr | Ce | Al | Zr |
| Example 10 | 20000 sec$^{-1}$ | 0.935 | 0.623 | 0.636 | 20.57 | 8.27 | 18.37 |
| Example 12 | 10000 sec$^{-1}$ | 0.907 | 0.605 | 0.733 | 21.70 | 8.21 | 19.53 |
| Example 13 | 4000 sec$^{-1}$ | 0.858 | 0.292 | 0.325 | 21.60 | 8.81 | 17.87 |
| Comparative Example 12 | 10 sec$^{-1}$ or less | 0.821 | 0.200 | 0.358 | 20.07 | 7.77 | 18.08 |

Moreover, component homogeneousness (uniformity) was also evaluated for metal oxide thin films formed on the surface of the metal plates by the methods described in Examples 6 to 8 and Comparative Example 10 as described above. Obtained results are shown in Table 14 and FIG. 7.

TABLE 14

| Shear rate | Proportion of value $|K - K_m|/K_m$ being 0.02 or less (%) | | | Mean $K_m$ (%) | | |
|---|---|---|---|---|---|---|
| | Ce | Al | Zr | Ce | Al | Zr |
| Example 6 | 20000 sec$^{-1}$ | 0.877 | 0.637 | 0.911 | 25.11 | 16.00 | 16.68 |
| Example 7 | 10000 sec$^{-1}$ | 0.768 | 0.662 | 0.690 | 21.35 | 8.07 | 16.20 |
| Example 8 | 4000 sec$^{-1}$ | 0.796 | 0.502 | 0.632 | 21.17 | 8.12 | 16.09 |
| Comparative Example 10 | 10 sec$^{-1}$ or less | 0.770 | 0.548 | 0.746 | 21.03 | 8.02 | 16.15 |

Figure 6:
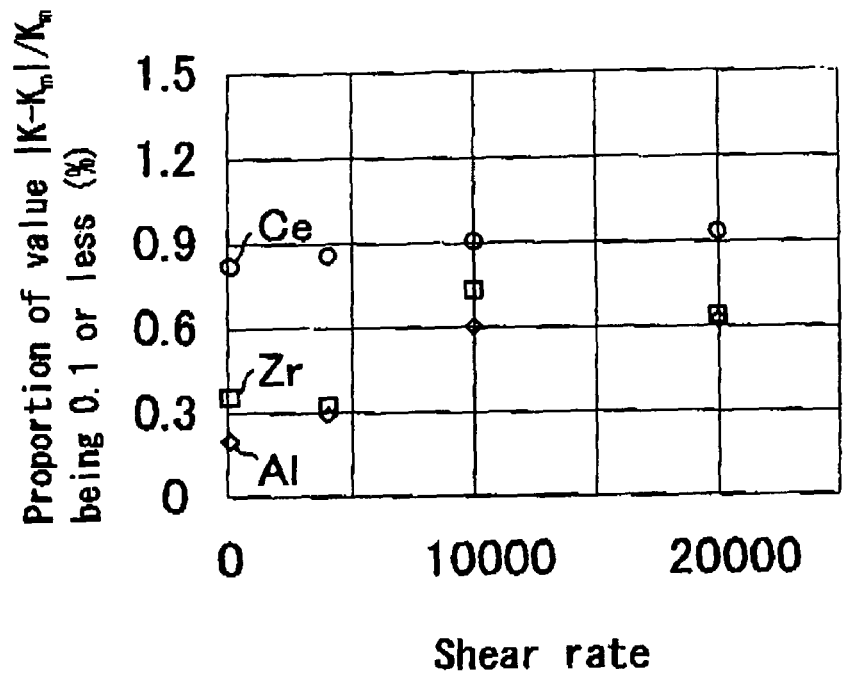
FIG. 6 is a graph showing a relationship between shear rates in the mixing step and homogeneous dispersibility of metal oxides.
Figure 7:
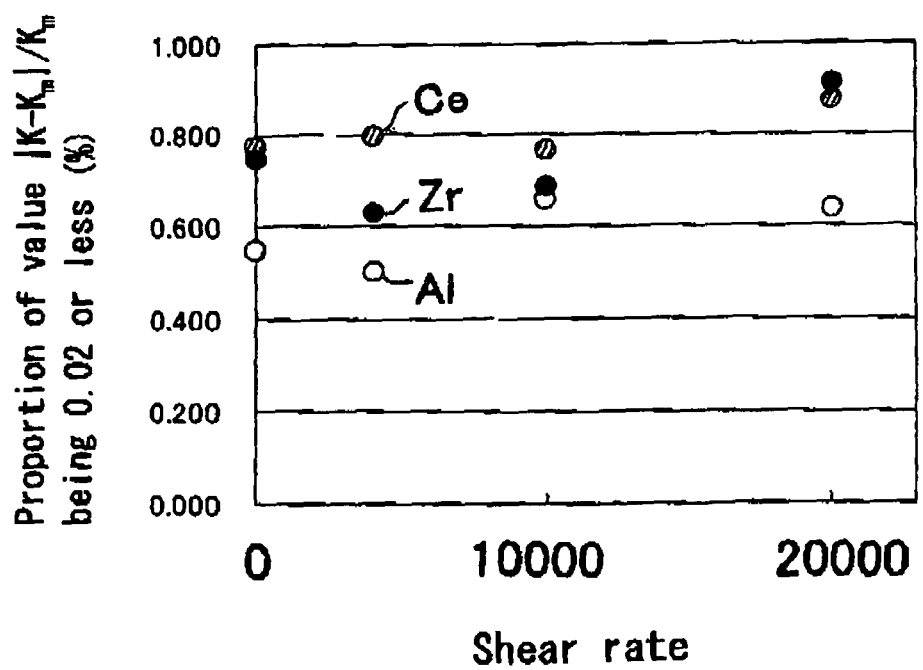
FIG. 7 is a graph showing a relationship between shear rates in the mixing step and homogeneous dispersibility of metal oxides.

As is apparent from the results shown in Tables 13 to 14 and FIGS. 6 to 7, improvements in homogeneous dispersibility (uniform dispersibility) of metal oxides in the obtained metal oxide thin films along with the increase in the shear rates at the time of mixing of fluid raw material composition were confirmed. It was also confirmed that the homogeneous dispersibility markedly improved especially when the shear rates were 10000 sec$^{-1}$ or higher.

<Heat Tolerance Test>

Heat tolerances of metal oxide coating obtained by the methods described in Example 1 and Comparative Examples 1 and 2, metal oxide powdered material obtained by the method described in Example 14, and conventional alumina/ceria/zirconia compound oxide powder obtained by conventional coprecipitation method described in Comparative Example 2, were evaluated as follows. In other words, relative surface areas (BET relative surface areas) were measured for each metal oxide coating and metal oxide powdered material after they were heated to 500° C., 900° C., and 1000° C. in an oxidizing atmosphere (in air) and were maintained in the same conditions for 5 hours, respectively.

Figure 8:
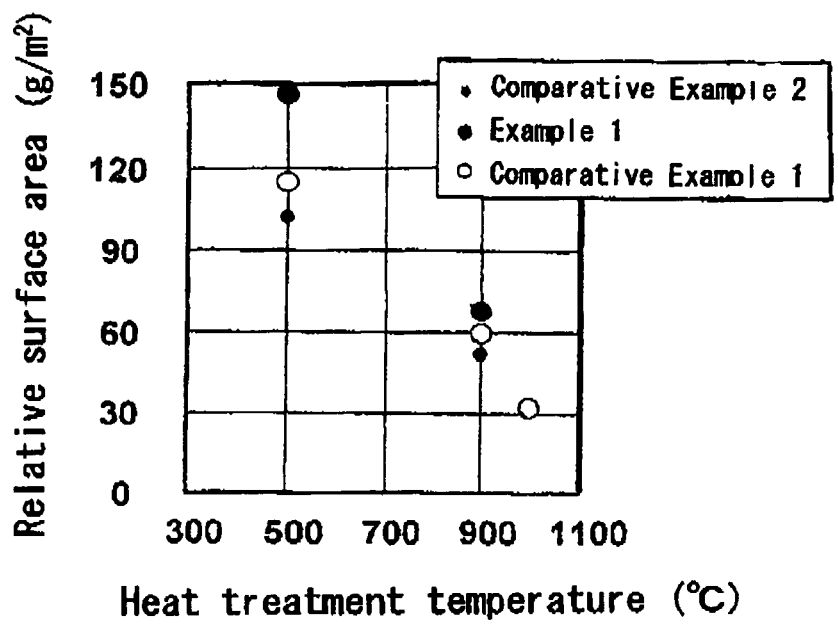
FIG. 8 is a graph showing results of heat tolerance test (comparisons among Example 1, Comparative Example 1, and Comparative Example 2).
Figure 9:
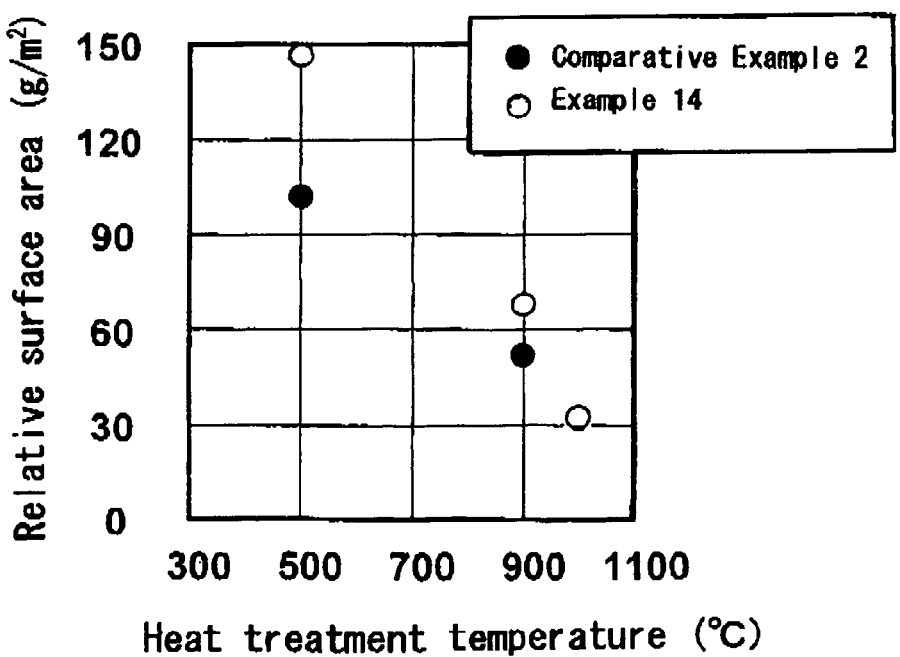
FIG. 9 is a graph showing results of heat tolerance test (comparison between Example 14 and Comparative Example 2).

Obtained results are shown in FIGS. 8 and 9. As is apparent from the results shown in FIGS. 8 and 9, great improvements in heat tolerances especially at 500° C. and 900° C. were observed for metal oxide coating and metal oxide powdered material of the present invention obtained by rapidly drying and calcinating colloidal solutions or metal salt solutions mixed at a high shear rate.

Moreover, heat tolerances for metal oxide powdered materials obtained by the methods described in Examples 14 and 15 and Comparative Examples 14 and 15 were evaluated as follows. In other words, relative surface areas (BET relative surface areas) were measured for each metal oxide powdered materials after they were heated to 900° C. in an oxidizing atmosphere (in air) and were maintained in the same conditions for 5 hours. Obtained results are as follows.

Example 14: BET surface area=67.8 m$^2$/g

Comparative Example 14: BET surface area=54.9 m$^2$/g

Example 15: BET surface area=54.7 m$^2$/g

Comparative Example 15: BET surface area=54.0 m$^2$/g

From the results described so far, great improvements in heat tolerance at 900° C. for metal oxide powdered material of the present invention which was obtained by rapidly drying and calcinating metal salt solutions mixed at a high shear rate were confirmed. Moreover, when the results of Examples 14 and 15 were compared, great improvements in heat tolerance for metal oxide powdered material obtained by rapidly drying and calcinating metal salt solutions mixed at a high shear rate were confirmed.

<Reforming Performance Test>

Reforming performances of catalysts obtained by using catalyst supports with metal oxide coating supported on the metallic high density (high integration) honeycombs with the methods described in Examples 2 to 5 and Comparative Examples 3 to 8 were evaluated as described below. In other words, each high density honeycomb supporting metal oxide coating was firstly immersed in Rh solution for one hour, pulled out, and then the excessive solution on its surface was removed by gravity and shaking. Subsequently, after being placed horizontally, the metallic high density honeycomb was gently dried at room temperature for 5 to 10 minutes, dried with warm air (60 to 100° C.) at a wind velocity of 2 to 5 m/s for 5 to 10 minutes, calcinated at 300° C. for approximately 60 minutes in the air atmosphere, and further cooled for 5 to 10 minutes with normal temperature air at a wind velocity of 2 to 5 m/s. After repeating such treatments three times, each metallic high density honeycomb supporting metal oxide coating supported 0.1 g of rhodium and thus, the catalysts for hydrogen production reaction were obtained.

Figure 10:
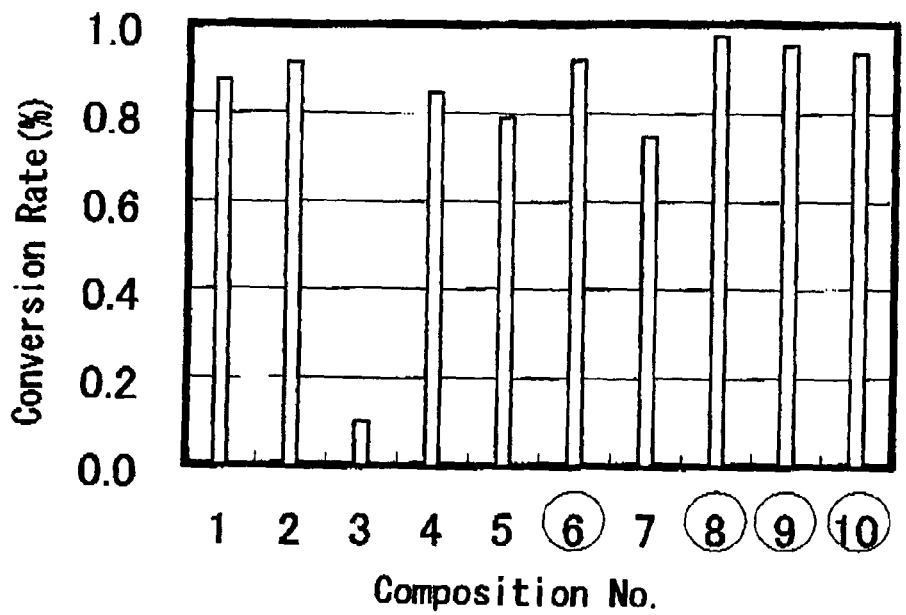
FIG. 10 is a graph showing the result of reforming performance test (conversion rate).

Then, each of the catalysts for hydrogen production reaction obtained in such a way was heated in an infra-red image furnace and reforming performance test was performed under conditions of space rate of 25000 h$^{-1}$, steam/carbon=2, and oxide/carbon=0.1 by use of isooctane as a reforming fuel. Moreover, as for temperature condition, outlet temperature was set to 550° C., and for measuring item, outlet gaseous components ($H_2$, CO, $CO_2$, $N_2$, $CH_4$, HC, and $H_2O$) were measured and conversion rates were calculated for each component according to its outlet concentration using the following equation. Obtained conversion rates are shown in FIG. 10. Additionally, concentrations of $H_2$ and $CH_4$ in the outlet gas are shown in FIG. 11.

Conversion rate (%)=(carbon in CO, $CO_2$, and $CH_4$)/(carbon in isooctane)

Figure 11:
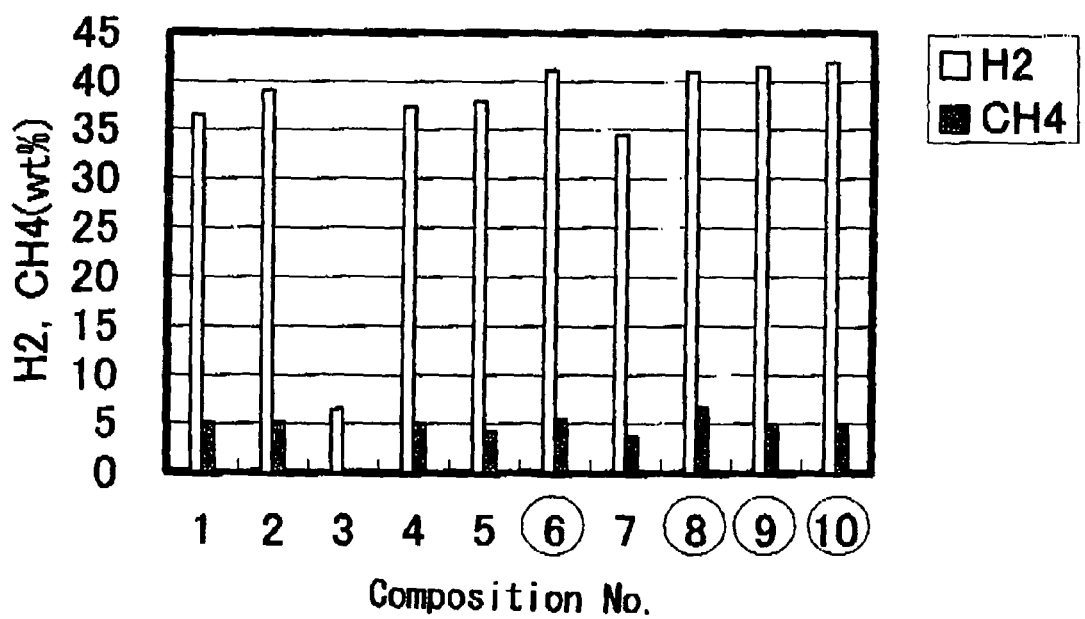
FIG. 11 is a graph showing the result of reforming performance test (concentrations of hydrogen and methane).

As is apparent from the results shown in FIGS. 10 and 11, high conversion rate of 92% or higher and high $H_2$ concentration of 40% or higher by weight were achieved at the same time in the catalysts for hydrogen production reaction of the present invention obtained by using catalyst supports obtained with the methods described in Examples 2 to 5 and Comparative Examples 3 to 8. Thus, excellence of obtained catalysts for hydrogen production reaction of the present invention in reforming performances was confirmed.

<Adhesion Test>

Adhesion of metal oxide coating (film thickness: approximately 5 μm) formed respectively on the metal plates, the cordierite plates, and SiC plates, by using methods described in Example 5 and Comparative Example 9 was evaluated as follows. That is, each substrate forming metal oxide coating on its surface was subjected to four times of ultrasonic vibration for 30 minutes by using ultrasonic cleaner and the remaining proportion (weight standard) of thin film during the process was measured.

Figure 12:
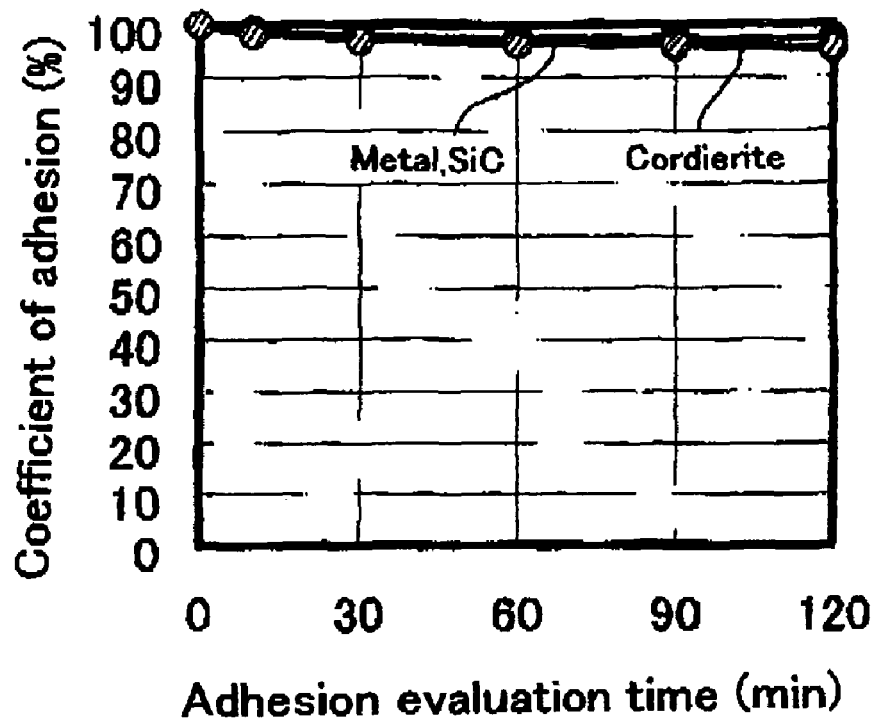
FIG. 12 is a graph showing the results of adhesion test (Examples 5).
Figure 13:
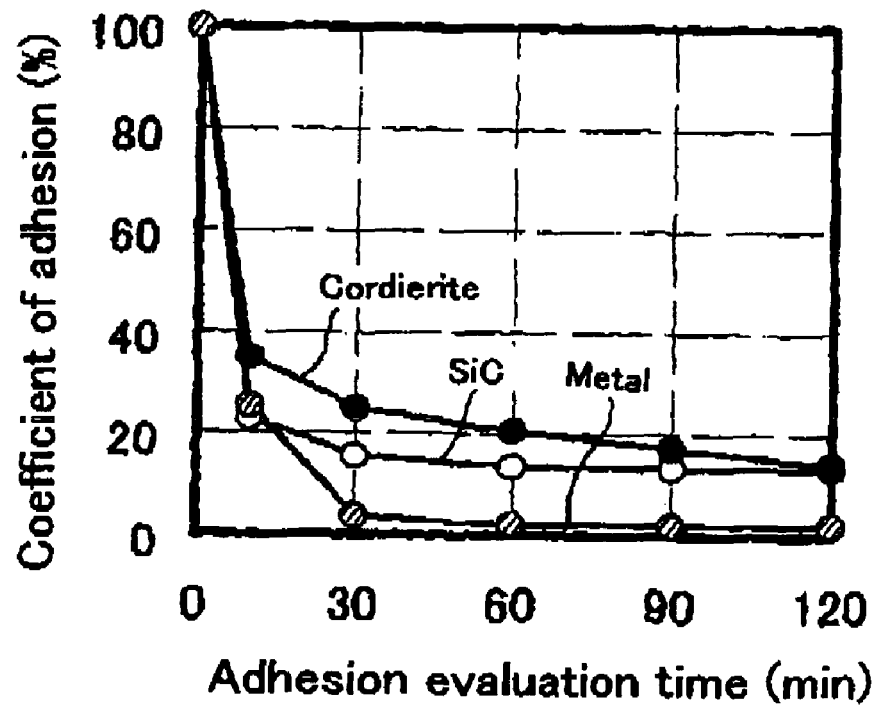
FIG. 13 is a graph showing the result of adhesion test (Comparative Example 9).

Obtained results are shown in FIGS. 12 (Example 5) and 13 (Comparative Example 9). As is apparent from the results shown in FIGS. 12 and 13, great improvements in adhesion to various substrates were confirmed in the catalyst supports for hydrogen production reaction of the present invention obtained by rapidly drying and calcinating the substrate applied with a colloidal solution mixed at a high shear rate.

In addition, adhesion of metal oxide coating formed on the metal plates by using the methods described in Examples 6 to 8 and Comparative Example 10 was also evaluated respectively as described above. Obtained results (remaining proportion after 2 hours (weight standard)) are shown in Table 15.

TABLE 15

| | Shear rate | Remaining proportion after 2 hours (%) |
|---|---|---|
| Example 6 | 20000 sec$^{-1}$ | 93 |
| Example 7 | 10000 sec$^{-1}$ | 85 |
| Example 8 | 4000 sec$^{-1}$ | 61 |
| Comparative Example 10 | 10 sec$^{-1}$ or less | 15 |

As is apparent from the results shown in Table 15, adhesion of obtained metal oxide thin film to various substrates improved as the shear rate at the time of mixing of fluid raw material composition increased, and in particular, great improvements in adhesion were confirmed when the shear rate were 10000 sec$^{-1}$ or higher.

<Evaluation of Nanopores>

The presence of nanopores was confirmed in the metal oxide thin film obtained by the method described in Example 1 and the metal oxide powdered material obtained by the method described in Example 9 by nitrogen adsorption and small angle X-ray scattering methods as described below.

Figure 14:
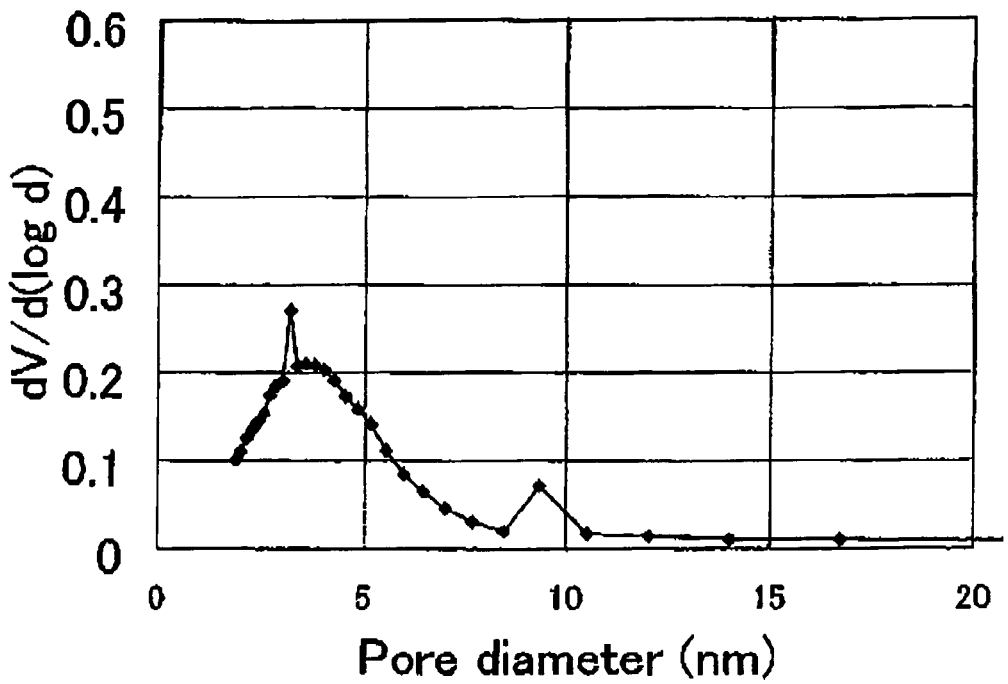
FIG. 14 is a graph showing the pore diameter distribution in the porous metal oxide materials obtained by nitrogen adsorption method.

Namely, nitrogen adsorption is a method to measure gas quantity adsorbed onto solid surface or gas quantity desorbed from solid surface at a certain equilibrium vapor pressure by static volumetric method. Isotherm data is obtained by either introducing known amount of adsorption gas into a sample cell containing a solid sample maintained at a constant temperature, which is a critical temperature of adsorbate, or removing known amount of adsorption gas from the sample cell. Gas quantity adsorbed or desorbed at an equilibrium pressure corresponds to the difference between gas quantity introduced or removed and gas quantity necessary for filling void portions in the sample periphery. In the present measurements, fully automated adsorption measuring instrument (Autosorb 1 MP/LP) manufactured by QUANTACHROME Corp. was used. Nitrogen adsorption measurement was made at a measuring temperature of −196° C. and a pressure relative to atmospheric pressure $P/P_0$ in a range of 0.00001 to 1 using a sample of 0.05 to 0.15 g, continued by the nitrogen desorption measurements with $P/P_0$ in a range of 0.01 to 1. Adsorption isotherm can be obtained by plotting nitrogen gas adsorption, and pore diameter distribution was obtained by an analyzing method called BJH method. Note here that this BJH method is the most efficient model for the calculation of mesoporous distribution assuming all pores are tubular type. Measured results for porous metal oxide material obtained in the method described in Example 1 are shown in FIG. 14.

Figure 15:
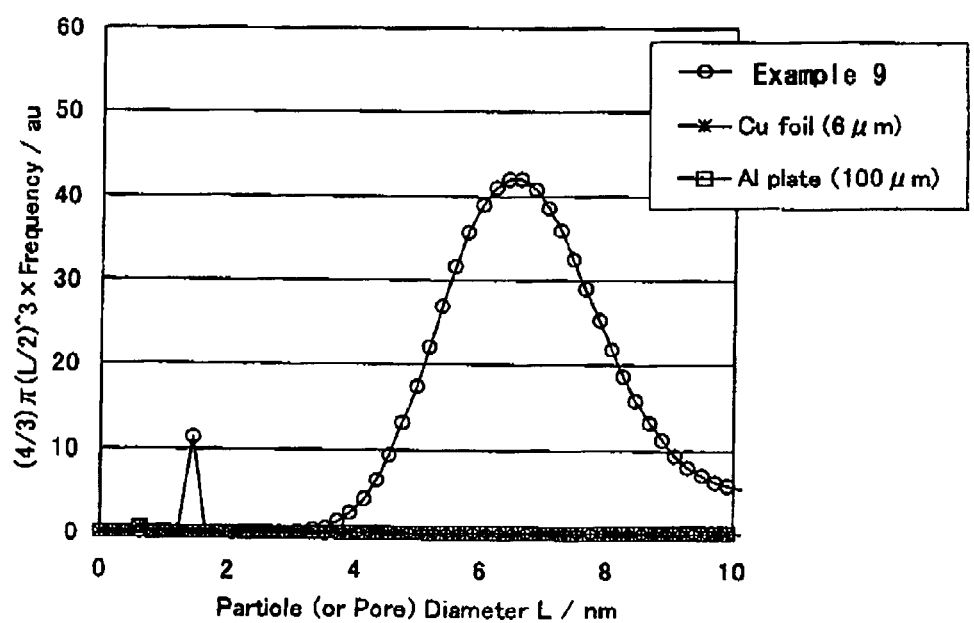
FIG. 15 is a graph showing the pore diameter distribution in the porous metal oxide materials obtained by small angle X-ray scattering method.

Moreover, X-ray undulator beam line of excellent parallelism and energy density in a synchrotron radiation facility was used for the small angle X-ray scattering method. X-ray energy was set to 10 keV (wavelength 0.124 nm) and X-ray beam was squeezed to approximately 0.04 mm×0.04 mm by use of a four quadrant slit and making it the origin of beam for the small angle X-ray scattering method. Excessive scattering light was blocked by placing a pin hole with a diameter of 0.5 mm approximately 65 cm downstream from the origin and the sample was placed immediately downstream of the pin hole attaching to it. Absorption was calculated so that the intensity of X-ray after transmitting the sample was 1/e (e being the base of natural logarithm) and appropriate sample thickness was derived. Compact sample was prepared according to this sample thickness. An imaging plate was placed precisely 50 cm downstream (115 cm downstream from the origin) from the sample and the scattered X-ray was recorded. An attenuator with a cover glass was placed at the position of transmitting X-ray to prevent damages in the imaging plate as well as to record the position of transmitting X-ray at appropriate intensity on the imaging plate. Average value of X-ray intensity recorded on the concentric circle, which has a position of transmitting X-ray on the imaging plate as a center, was derived, and scattering angle was plotted against intensity by converting the radius of concentric circle to the angle for the analysis. An appropriate distribution capable of explaining the plot of scattering angle against intensity was found by appropriately changing the distribution of scatterer radius assuming a spherical scatterer in the sample. Measured results for the porous metal oxide material obtained by the method described in Example 9 are shown in FIG. 15. Moreover, measured results for copper foil (thickness of 6 μm) and aluminum foil (thickness of 100 μm) which have bulk body are also shown in FIG. 15 for comparison.

As is apparent from the results shown in these figures, especially in FIG. 15, the formation of considerably fine nanopores whose diameters are 2 nm or less in the porous metal oxide material of the present invention obtained by the method of the present invention was confirmed.

As described so far, by mixing colloidal solutions of metal oxides or metal salt solutions at a high shear rate and heat treating the resultant without practical coprecipitation, obtained nanoporous metal oxide materials surprisingly novel having nanopores with diameters of 10 nm or less and having their metal oxides dispersed homogenously in the wall constituting the nanopores. Adhesion to various substrates and heat tolerance are also improved in the obtained nanoporous metal oxide materials and furthermore, thin film formation also becomes possible. Additionally, by making components constituting such nanoporous metal oxide materials as zirconia/ceria binary-component containing specified amounts of zirconia and ceria, or as zirconia/ceria/alumina triple-component containing specified amounts of zirconia, ceria, and alumina in the present invention, catalysts for hydrogen production reaction with highly excellent reforming performances in hydrogen production reaction can be obtained.

Therefore, the present invention is a considerably useful technology to obtain catalysts for hydrogen production reaction to generate hydrogen as a fuel in separation membrane cell systems like fuel cells.

What is claimed is:

1. A nanoporous metal oxide material comprising two or more metal oxides, wherein the nanoporous metal oxide material has a ceria content of 10 to 60 weight %, a zirconia content of 20 to 90 weight %, and an alumina content of 70 weight % or less, and has nanopores whose diameters are 10 nm or less, and the metal oxides are homogeneously dispersed in a wall constituting the nanopores; and wherein when spectra for all metal elements of metal oxides whose content in the nanoporous metal oxide material is 10 at % or more are measured by energy dispersive X-ray spectroscopy at measuring points in a region where a sample thickness can be regarded as almost constant using transmission electron microscope with an electron beam diameter of 1.0 nm and an accelerating voltage of 200 kV, a mean $X_m$ of relative intensity ratio X derived by converting integrated intensity of fluorescent X-ray peak of each metal element in obtained spectra to relative ratio, and a second moment $\nu_2$ around the mean $X_m$ satisfy a condition expressed by a formula (I) for all the metal elements:

$$\nu_2/X_m^2 \leq 0.02 \qquad (1)$$

wherein $X_m$ is the mean of relative intensity ratio X and is described by an equation $X_m=(\Sigma X)/N$ (N being the number of measuring points), $\nu_2$ is the second moment around the mean $X_m$ and is described by an equation $\nu_2=\{\Sigma(X-X_m)^2\}/N$, and $\nu_2/X_m^2$ is a second moment normalized to the square of the mean $X_m$, in the formula (1).

2. The nanoporous metal oxide material according to claim 1, wherein the nanoporous metal oxide material is obtained by heat treating a fluid raw material composition comprising zirconia colloidal particles and/or a zirconium salt solution and ceria colloidal particles and/or a cerium salt solution without practical coprecipitation after mixing the composition at a shear rate of 10,000 sec$^{-1}$ or higher.

3. The nanoporous metal oxide material according to claim 2, wherein the fluid raw material composition further comprises one or more of alumina colloidal particles and an aluminum salt solution.

4. The nanoporous metal oxide material according to claim 1, further comprising at least one powder selected from the group consisting of a zirconia powder, a ceria powder and an alumina powder, each of the powders having an average particle size of 0.01 to 50 μm.

5. The nanoporous metal oxide material according to claim 1, wherein when an equation (2) is obtained by an arbitrary line analysis of a range of 0.5 mm or more for all metal elements of metal oxides whose content is 10 at % or more in the nanoporous metal oxide material using X-ray microanalyzer with an electron beam diameter of 1.0 μm and an accelerating voltage of 15 kV, a K value expressed by the equation (2) satisfies a condition expressed by a formula (3) for all the metal elements in 65% or more of measuring points out of total measuring points:

K value (%)=(X-ray intensity detected from nanoporous metal oxide material)/(X-ray intensity obtained from pure substance) (2)

$$\frac{|K - Km|}{Km} \leq 0.02 \qquad (3)$$

wherein K is the K value (%) at each measuring point and $K_m$ is a mean of K values of all the measuring points, in the formula (3).

6. The nanoporous metal oxide material according to claim 1, wherein when a surface height image of the nanoporous metal oxide material is measured arbitrarily with a tapping mode by a scanning probe microscope using a tip with a curvature radius of 5 nm with an interval of 3 nm or more and less than 4 nm, a height image H(L) derived as a function of a scan length L total of 2 μm or more satisfies a condition expressed by a formula (4) in 80% or more of measuring points out of total measuring points and also a second derivative H" (L) derived from formulae (5) and (6) satisfies a condition expressed by a formula (7) in 60% or less of measuring points out of total measuring points:

$$H(L) \leq 20 \text{ nm} \qquad (4)$$

wherein H(L) is a height image (nm) at each measuring point (scan length=L) in the formula (4);

$$H'(L) = \frac{dH}{dL} = \frac{H(L+\Delta L) - H(L)}{\Delta L} \qquad (5)$$

$$H''(L) = \frac{d^2H}{dL^2} = \frac{H'(L+\Delta L) - H'(L)}{\Delta L} \qquad (6)$$

wherein H(L) is a height image (nm) at a measuring point where a scan length=L, H(L+ΔL) is a height image (nm) at a measuring point where a scan length=L+ΔL, ΔL is an interval (nm) among measuring points, H'(L) is a first derivative of a height image H(L), H'(L+ΔL) is a first derivative of a height image H(L+ΔL), and H"(L) is a second derivative of a height image H(L), in the formulae (5) and (6) and ΔL is set to 4 nm by linear interpolation among measuring points; and $$-0.05 \text{ nm}^{-1} \leq H''(L) \leq 0.05 \text{ nm}^{-1} \qquad (7).$$

7. The nanoporous metal oxide material according to claim 1, wherein when a measuring line is drawn arbitrarily for total of 400 μm or more on the nanoporous metal oxide material in an electron micrograph of a section of the nanoporous metal oxide material, a length ratio of a part where the measuring line intersects with a void portion formed in the nanoporous metal oxide material satisfies a condition that it is 10% or less of a total length of the measuring line.

8. The nanoporous metal oxide material according to claim 1, wherein when spectra for all metal elements of metal oxides whose content in the nanoporous metal oxide material is 10 at % or more are measured by energy dispersive X-ray spectroscopy at 10 or more arbitral measuring points using transmission electron microscope with an electron beam diameter of 1.0 nm and an accelerating voltage of 200 kV, a mean $X_m$ of relative intensity ratio X derived by converting integrated intensity of fluorescent X-ray peak of each metal element in obtained spectra to relative ratio and a second moment $v_2$ around the mean $X_m$ satisfy a condition expressed by a formula (8) for all the metal elements:

$$v_2/X_m^2 \leq 0.1 \tag{8}$$

wherein $X_m$ is the mean of relative intensity ratio X and is described by an equation $X_m=(\Sigma X)/N$ (N being the number of measuring points), $v_2$ is the second moment around the mean $X_m$ and is described by an equation $v_2=\{\Sigma(X-X_m)^2\}/N$, and $v_2/X_m^2$ is a second moment normalized to the square of the mean $X_m$, in the formula (8).

9. The nanoporous metal oxide material according to claim 1, further comprising a noble metal supported on the surface of the nanoporous metal oxide material.

10. A catalyst support comprising:
a substrate, and a coating comprising nanoporous metal oxide material formed from two or more metal oxides formed on the surface of the substrate,
wherein the nanoporous metal oxide material has a ceria content of 10 to 60 weight %, a zirconia content of 20 to 90 weight %, and an alumina content of 70 weight % or less, and has nanopores whose diameters are 10 nm or less, and the metal oxides are homogeneously dispersed in a wall constituting the nanopores; and
wherein when spectra for all metal elements of metal oxides whose content in the nanoporous metal oxide material is 10 at % or more are measured by energy dispersive X-ray spectroscopy at measuring points in a region where a sample thickness can be regarded as almost constant using transmission electron microscope with an electron beam diameter of 1.0 nm and an accelerating voltage of 200 kV, a mean $X_m$ of relative intensity ratio X derived by converting integrated intensity of fluorescent X-ray peak of each metal element in obtained spectra to relative ratio and a second moment $v_2$ around the mean $X_m$ satisfy a condition expressed by a formula (I) for all the metal elements:

$$v_2/X_m^2 \leq 0.02 \tag{1}$$

wherein $X_m$ is the mean of relative intensity ratio X and is described by an equation $X_m=(\Sigma X)/N$ (N being the number of measuring points), $v_2$ is the second moment around the mean $X_m$ and is described by an equation $v_2=\{\Sigma(X-X_m)^2\}/N$, and $v_2/X_m^2$ is a second moment normalized to the square of the mean $X_m$, in the formula (1).

11. The catalyst support according to claim 10,
wherein the nanoporous metal oxide material is obtained by heat treating the substrate after applied, without practical coprecipitation, with a fluid raw material composition comprising zirconia colloidal particles and/or a zirconium salt solution and ceria colloidal particles and/or a cerium salt solution mixed at a shear rate of 10,000 sec$^{-1}$ or higher.

12. The catalyst support according to claim 11,
wherein the fluid raw material composition further comprises one or more of alumina colloidal particles and an aluminum salt solution.

13. The catalyst support according to claim 10,
further comprising at least one powder selected from the group consisting of a zirconia powder, a ceria powder and an alumina powder, each of the powders having an average particle size of 0.01 to 50 μm.

14. The catalyst support according to claim 10,
wherein when an equation (2) is obtained by an arbitrary line analysis of a range of 0.5 mm or more for all metal elements of metal oxides whose content is 10 at % or more in the nanoporous metal oxide material using X-ray microanalyzer with an electron beam diameter of 1.0 μm and an accelerating voltage of 15 kV, a K value expressed by the equation (2) satisfies a condition expressed by a formula (3) for all the metal elements in 65% or more of measuring points out of total measuring points:

$K$ value (%)=(X-ray intensity detected from nanoporous metal oxide material)/(X-ray intensity obtained from pure substance) \hfill (2)

$$\frac{|K - Km|}{Km} \leq 0.02 \tag{3}$$

wherein K is the K value (%) at each measuring point and $K_m$ is a mean of K values of all the measuring points, in the formula (3).

15. The catalyst support according to claim 10,
wherein when a surface height image of the nanoporous metal oxide material is measured arbitrarily with a tapping mode by a scanning probe microscope using a tip with a curvature radius of 5 nm with an interval of 3 nm or more and less than 4 nm, a height image H(L) derived as a function of a scan length L total of 2 μm or more satisfies a condition expressed by a formula (4) in 80% or more of measuring points out of total measuring points and also a second derivative H"(L) derived from formulae (5) and (6) satisfies a condition expressed by a formula (7) in 60% or less of measuring points out of total measuring points:

$$H(L) \leq 20 \text{ nm} \tag{4}$$

wherein H(L) is a height image (nm) at each measuring point (scan length=L) in the formula (4);

$$H'(L) = \frac{dH}{dL} = \frac{H(L+\Delta L) - H(L)}{\Delta L} \tag{5}$$

$$H''(L) = \frac{d^2 H}{dL^2} = \frac{H'(L+\Delta L) - H'(L)}{\Delta L} \tag{6}$$

wherein H(L) is a height image (nm) at a measuring point where a scan length=L, H(L+ΔL) is a height image (nm) at a measuring point where a scan length=L+ΔL, ΔL is an interval (nm) among measuring points, H'(L) is a first derivative of a height image H(L), H'(L+ΔL) is a first derivative of a height image H(L+ΔL), and H"(L) is a second derivative of a height image H(L), in the formulae (5) and (6) and ΔL is set to 4 nm by linear interpolation among measuring points; and $$-0.05 \text{ nm}^{-1} \leq H''(L) \leq 0.05 \text{ nm}^{-1} \tag{7}.$$

16. The catalyst support according to claim 10,
wherein when a measuring line is drawn arbitrarily for total of 400 μm or more on the nanoporous metal oxide material in an electron micrograph of a section of the nanoporous metal oxide material, a length ratio of a part where the measuring line intersects with a void portion formed in the nanoporous metal oxide material satisfies a condition that it is 10% or less of a total length of the measuring line.

17. The catalyst support according to claim 10, wherein when spectra for all metal elements of metal oxides whose content in the nanoporous metal oxide material is 10 at % or more are measured with energy dispersive X-ray spectroscopy at 10 or more arbitral measuring points using transmission electron microscope with an electron beam diameter of 1.0 nm and an accelerating voltage of 200 kV, a mean $X_m$ of relative intensity ratio X derived by converting integrated intensity of fluorescent X-ray peak of each metal element in obtained spectra to relative ratio and a second moment $v_2$ around the mean $X_m$ satisfy a condition expressed by a formula (8) for all the metal elements:

$$v_2/X_m^2 \leq 0.1 \tag{8}$$

wherein $X_m$ is the mean of relative intensity ratio X and is described by an equation $X_m=(\Sigma X)/N$ (N being the number of measuring points), $v_2$ is the second moment around the mean $X_m$ and is described by an equation $v_2=\{\Sigma(X-X_m)^2\}/N$, and $v_2/X_m^2$ is a second moment normalized to the square of the mean $X_m$, in the formula (8).

18. A catalyst for a hydrogen production reaction comprising the catalyst support according to claim 10 and a noble metal supported on the surface of the catalyst support.

* * * * *